US010223100B2

(12) United States Patent
Dufresne

(10) Patent No.: US 10,223,100 B2
(45) Date of Patent: *Mar. 5, 2019

(54) SYSTEM AND METHOD FOR PROVIDING SUPPLEMENTAL FUNCTIONALITIES TO A COMPUTER PROGRAM VIA AN ONTOLOGY INSTANCE

(71) Applicant: ReactiveCore LLC, New York, NY (US)

(72) Inventor: Michel Dufresne, Saint-Eustache (CA)

(73) Assignee: REACTIVECORE LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/633,680

(22) Filed: Jun. 26, 2017

(65) Prior Publication Data

US 2017/0293482 A1    Oct. 12, 2017

Related U.S. Application Data

(63) Continuation of application No. 15/393,238, filed on Dec. 28, 2016, now Pat. No. 9,766,879, which is a
(Continued)

(51) Int. Cl.
*G06F 9/44* (2018.01)
*G06F 8/65* (2018.01)
(Continued)

(52) U.S. Cl.
CPC ............ *G06F 8/65* (2013.01); *G06F 8/20* (2013.01); *G06N 5/00* (2013.01)

(58) Field of Classification Search
CPC ........................................................ G06F 8/65
(Continued)

(56) References Cited

U.S. PATENT DOCUMENTS 6,102,968 A    8/2000  Colby et al.
6,199,195 B1   3/2001  Goodwin
(Continued)

OTHER PUBLICATIONS

Buche et al, "Fuzzy Querying of Incomplete, Imprecise, and Heterogeneously Structured Data in the Relational Model Using Ontologies and Rules", IEEE Transactions on Fuzzy Systems, vol. 13, No. 3, pp. 373-383, 2005 (Year: 2005).*
(Continued)

*Primary Examiner* — Anil Khatri
(74) *Attorney, Agent, or Firm* — Pillsbury Winthrop Shaw Pittman LLP

(57) ABSTRACT

Supplemental functionalities may be provided for an executable program via an ontology instance. In some embodiments, a computer program (e.g., an executable program or other computer program) associated with an ontology may be caused to be run. The ontology may include information indicating attributes for a set of applications. An instance of the ontology may be obtained, which may correspond to an application of the set of applications. Based on the ontology instance, supplemental information may be generated for the computer program. The supplemental information may be related to one or more functionalities of the application to be added to the executable program. The supplemental information may be provided as input to the computer program. The supplemental information, at least in part, may cause the one or more functionalities of the application to be made available via the executable program.

20 Claims, 15 Drawing Sheets

Related U.S. Application Data continuation of application No. 14/859,016, filed on Sep. 18, 2015, now Pat. No. 9,552,200.

(51) Int. Cl.
  *G06F 8/20* (2018.01)
  *G06N 5/00* (2006.01)

(58) Field of Classification Search
  USPC .................................................. 717/168–175
  See application file for complete search history.

(56) References Cited

U.S. PATENT DOCUMENTS

| | | | |
|---|---|---|---|
| 6,675,382 B1 | 1/2004 | Foster | |
| 6,789,252 B1 | 9/2004 | Burke et al. | |
| 7,093,200 B2 | 8/2006 | Schreiber | |
| 7,096,459 B2 | 8/2006 | Keller et al. | |
| 7,152,228 B2 | 12/2006 | Goodwin | |
| 7,155,715 B1* | 12/2006 | Cui | G06F 8/75 717/177 |
| 7,200,563 B1 | 4/2007 | Hammitt | |
| 7,337,440 B1 | 2/2008 | Schmidt et al. | |
| 7,373,325 B1 | 5/2008 | Hadingham | |
| 7,376,670 B2 | 5/2008 | Badt et al. | |
| 7,496,891 B2* | 2/2009 | Bou-Ghannam | G06F 8/65 717/111 |
| 7,631,301 B2 | 12/2009 | Fortier | |
| 7,640,532 B2 | 12/2009 | Jain et al. | |
| 7,716,286 B2* | 5/2010 | Heins | G06Q 10/10 709/201 |
| 7,730,123 B1* | 6/2010 | Erickson | G06F 17/3089 709/203 |
| 7,747,980 B2* | 6/2010 | Illowsky | G06F 1/3203 717/107 |
| 7,756,870 B2 | 7/2010 | Buchmann et al. | |
| 7,770,121 B2 | 8/2010 | Jain et al. | |
| 7,784,047 B2 | 8/2010 | Simpson | |
| 7,784,838 B2 | 8/2010 | Levy | |
| 7,890,517 B2 | 2/2011 | Angelo | |
| 7,895,568 B1 | 2/2011 | Goodwin | |
| 7,899,764 B2 | 3/2011 | Martin | |
| 8,001,539 B2* | 8/2011 | Mitchell | G06F 17/30551 717/130 |
| 8,028,283 B2 | 9/2011 | Sheshagiri et al. | |
| 8,091,081 B2 | 1/2012 | Thorson | |
| 8,112,257 B2 | 2/2012 | Weber et al. | |
| 8,127,286 B2 | 2/2012 | London | |
| 8,131,838 B2* | 3/2012 | Bornhoevd | G06F 9/54 709/217 |
| 8,135,655 B2 | 3/2012 | Oaten | |
| 8,140,680 B2 | 3/2012 | Behrendt et al. | |
| 8,171,055 B2 | 5/2012 | Min et al. | |
| 8,176,048 B2 | 5/2012 | Morgan | |
| 8,204,870 B2 | 6/2012 | Mukkamala | |
| 8,214,372 B2* | 7/2012 | Gupta | G06F 9/44505 707/748 |
| 8,217,756 B2 | 7/2012 | Kumar et al. | |
| 8,255,903 B2* | 8/2012 | Williams | G06F 8/65 717/174 |
| 8,291,006 B2 | 10/2012 | Andrade et al. | |
| 8,370,812 B2 | 2/2013 | Feblowitz et al. | |
| 8,370,863 B2 | 2/2013 | Grigoriev et al. | |
| 8,402,081 B2 | 3/2013 | Sandoval et al. | |
| 8,407,677 B2 | 3/2013 | Pradadarao | |
| 8,418,125 B2 | 4/2013 | Hawkins | |
| 8,423,952 B2 | 4/2013 | Bogl | |
| 8,448,164 B2 | 5/2013 | Greiner | |
| 8,468,244 B2 | 6/2013 | Redlich | |
| 8,484,283 B2 | 7/2013 | Afergan | |
| 8,494,894 B2 | 7/2013 | Jaster | |
| 8,516,435 B2 | 8/2013 | Akkiraju | |
| 8,522,195 B2 | 8/2013 | Miloslavsky | |
| 8,595,138 B2 | 11/2013 | Sun et al. | |
| 8,620,931 B2 | 12/2013 | Zillner | |
| 8,620,941 B2 | 12/2013 | Seo et al. | |
| 8,635,232 B2 | 1/2014 | Brooks | |
| 8,650,479 B2 | 2/2014 | Jardine-Skinner | |
| 8,660,905 B2 | 2/2014 | Weber et al. | |
| 8,661,107 B2* | 2/2014 | Oliver Hoffmann | G06Q 10/10 705/348 |
| 8,666,922 B2 | 3/2014 | Hohimer et al. | |
| 8,667,477 B2 | 3/2014 | Bentzien et al. | |
| 8,676,833 B2 | 3/2014 | Chunilal | |
| 8,688,749 B1 | 4/2014 | Ducott, III | |
| 8,712,947 B2 | 4/2014 | Shanmukh et al. | |
| 8,713,012 B2 | 4/2014 | Martino et al. | |
| 8,732,593 B2 | 5/2014 | Van Wie | |
| 8,739,124 B2* | 5/2014 | Ritter | G06F 8/36 717/100 |
| 8,739,150 B2* | 5/2014 | Gass | G06F 8/72 717/168 |
| 8,782,597 B2* | 7/2014 | Wang | G06F 8/65 707/737 |
| 8,788,566 B2 | 7/2014 | Liu | |
| 8,832,675 B1 | 9/2014 | Abderrazzaq | |
| 8,849,862 B2 | 9/2014 | Visscher | |
| 8,863,102 B2 | 10/2014 | Feblowitz | |
| 8,892,419 B2 | 11/2014 | Lundberg et al. | |
| 8,930,178 B2 | 1/2015 | Pestian | |
| 8,930,957 B2 | 1/2015 | Assuncao | |
| 8,935,274 B1 | 1/2015 | Mihailovici | |
| 8,965,957 B2 | 2/2015 | Barros | |
| 8,996,660 B2 | 3/2015 | Nusser | |
| 9,002,896 B2 | 4/2015 | Shepherd et al. | |
| 9,021,456 B2* | 4/2015 | Bou-Ghannam | G06F 8/20 709/223 |
| 9,170,803 B2 | 10/2015 | Pavlík et al. | |
| 9,183,501 B2 | 11/2015 | Bentley | |
| 9,213,539 B2 | 12/2015 | Huynh et al. | |
| 9,213,698 B1 | 12/2015 | Tsypliaev et al. | |
| 9,262,126 B2 | 2/2016 | Ghaisas | |
| 9,335,991 B1 | 5/2016 | Dufresne | |
| 9,372,667 B2 | 6/2016 | Kossmann | |
| 9,372,684 B1 | 6/2016 | Dufresne | |
| 9,582,495 B2 | 2/2017 | Song | |
| 9,672,497 B1 | 6/2017 | Lewis et al. | |
| 9,800,644 B2 | 10/2017 | Ben Jemâa | |
| 9,870,247 B2 | 1/2018 | Suit et al. | |
| 9,871,888 B2 | 1/2018 | Sankaranarasimhan | |
| 9,940,581 B2 | 4/2018 | Bostick et al. | |
| 2003/0014502 A1 | 1/2003 | Snider | |
| 2003/0115078 A1 | 6/2003 | Young | |
| 2005/0197995 A1 | 9/2005 | Badt et al. | |
| 2005/0289504 A1 | 12/2005 | Buchmann et al. | |
| 2006/0020565 A1 | 1/2006 | Rzevski et al. | |
| 2006/0053172 A1 | 3/2006 | Gardner et al. | |
| 2006/0130024 A1 | 6/2006 | Fortier | |
| 2007/0038438 A1 | 2/2007 | Cho et al. | |
| 2007/0299799 A1 | 12/2007 | Meehan | |
| 2008/0243770 A1 | 10/2008 | Aasman | |
| 2008/0320460 A1 | 12/2008 | Miller | |
| 2009/0037237 A1 | 2/2009 | Weber et al. | |
| 2009/0063224 A1 | 3/2009 | Gorthi et al. | |
| 2009/0083110 A1 | 3/2009 | Markovic et al. | |
| 2009/0113394 A1 | 4/2009 | Weber et al. | |
| 2009/0119095 A1 | 5/2009 | Beggelman et al. | |
| 2009/0144306 A1 | 6/2009 | Min et al. | |
| 2009/0177777 A1 | 7/2009 | Behrendt et al. | |
| 2009/0249374 A1 | 10/2009 | Hepper | |
| 2009/0319981 A1 | 12/2009 | Akkiraju et al. | |
| 2010/0010957 A1 | 1/2010 | Cho et al. | |
| 2010/0082691 A1 | 4/2010 | Jaster | |
| 2010/0107165 A1 | 4/2010 | Koskimies et al. | |
| 2010/0153160 A1 | 6/2010 | Bezemer et al. | |
| 2010/0162222 A1 | 6/2010 | Bou-Ghannam et al. | |
| 2010/0333078 A1 | 12/2010 | Sun et al. | |
| 2011/0934363 | 4/2011 | Oliver | |
| 2011/0113069 A1 | 5/2011 | Morgan | |
| 2011/0131560 A1 | 6/2011 | Pradadarao | |
| 2011/0225293 A1 | 9/2011 | Rathod | |
| 2011/0289520 A1 | 11/2011 | Grigoriev et al. | |
| 2012/0016858 A1 | 1/2012 | Rathod | |
| 2012/0159441 A1 | 6/2012 | Ghaisas | |

(56) References Cited

U.S. PATENT DOCUMENTS

| | | |
|---|---|---|
| 2012/0166992 A1 | 6/2012 | Huynh et al. |
| 2012/0239605 A1 | 9/2012 | Hohimer et al. |
| 2012/0310963 A1 | 12/2012 | Seo et al. |
| 2013/0054286 A1 | 2/2013 | Oberhofer et al. |
| 2013/0066921 A1 | 3/2013 | Mark et al. |
| 2013/0268260 A1 | 10/2013 | Lundberg et al. |
| 2013/0275164 A1 | 10/2013 | Gruber et al. |
| 2014/0142924 A1 | 5/2014 | Friedman |
| 2014/0156733 A1 | 6/2014 | Goranson |
| 2014/0279201 A1 | 9/2014 | Lyoob |
| 2014/0280918 A1 | 9/2014 | Grandhe |
| 2014/0281846 A1 | 9/2014 | Sorin et al. |
| 2014/0324501 A1 | 10/2014 | Davidow et al. |
| 2014/0337273 A1 | 11/2014 | Bentley et al. |
| 2015/0007156 A1 | 1/2015 | Tkach et al. |
| 2015/0019207 A1 | 1/2015 | Dou et al. |
| 2015/0040099 A1 | 2/2015 | Mall et al. |
| 2015/0095473 A1 | 4/2015 | Goetsch et al. |
| 2015/0178071 A1 | 6/2015 | Pavlík et al. |
| 2015/0227452 A1 | 8/2015 | Raghavan et al. |
| 2015/0254289 A1 | 9/2015 | Junkergard et al. |
| 2015/0363386 A1 | 12/2015 | Song |

OTHER PUBLICATIONS

Necib et al, "Semantic Query Transformation using Ontologies", ACM, pp. 1-13, 2005 (Year: 2005).*
Leidig et al, "Improving Simulation Management Systems through Ontology Generation and Utilization", ACM, pp. 435-436, 2011 Year: 2011).*
Labsky et al, "Towards Web Information Extraction using Extraction Ontologies and (Indirectly) Domain Ontologies", ACM, pp. 201-202, 2007 (Year: 2007).*
Breis et al, "Towards Scott Domains-Based Topological Ontology Models: An Application to a Cancer Domain", ACM, pp. 127-138, 2001 (Year: 2001).*
Su et al, "ODE: Ontology-Assisted Data Extraction", ACM Transactions on Database Systems, vol. 34, No. 2, Article 12, pp. 1-35, 2009. (Year: 2009).*
Notice of Allowance dated Mar. 13, 2017 in corresponding U.S. Appl. No. 15/093,714 (9 pages).
Notice of Allowance dated Jun. 21, 2017 in corresponding U.S. Appl. No. 115/424,768 (6 pages).
Notice of Allowance dated May 12, 2017 in corresponding U.S. Appl. No. 15/393,238 (16 pages).
Falconer et al, "An Analysis of Collaborative Patterns in Large-Scale Ontology Development Projects", ACM, pp. 1-7, 2011.
Li et al, "Efficient Extraction of Ontologies from Domain Specific Text Corpora", ACM, pp. 1537-1541, 2012.
Salomie et al, "Towards Automated Web Service Composition with Fluent Calculus and Domain Ontologies", ACM, pp. 201-207, 2008.
Belmonte et al, "Using Domain Ontologies in a Dynamic Analysis for Program Comprehension", ACM, pp. 1-6, 2010.
Fengel et al,"Model-Based Domain Ontology Engineering", ACM, pp. 55-58, 2009.
Hamza, "Developing Business Object Models with Patterns and Ontologies", ACM, pp. 106-107,2005.
Damjanovic, "Ontology Design Patterns for the Semantic Business Processes", ACM, pp. 51-54, 2009.
Cestnik et al, "Constructing Semantic Ontologies for Business Analytics" ACM, pp. 436-441, 2010.
Obrst et al, "Ontological Engineering for B2B E-Commerce", ACM, pp. 117-226, 2001.
Dasilva et al., Ontology-based multi-domain metadata for research data management using triple stores, Jul. 2014, 10 pages.
Goknil et al., Ontological perspective in metamodeling for model transformations, Nov. 2005, 7 pages.
Roy-Choudhary et al., Cross-platform feature matching for web applications, Jul. 2014, 11 pages.
Ramprasad et al, "Ontological Design", ACM, pp. 1-7, 2009.
Amagasa et al, "A Scheme for Privacy-Preserving Ontology Mapping", ACM, pp. 87-95, 2014.
Arpirez et al, "WebODE: a Scalable Workbench for Ontological Engineering", ACM, pp. 6-13, 2001.
Berri et al, "Ontology-based Framework for Context-aware Mobile Learning", ACM, pp. 1307-1310, 2006.
Notice of Allowance dated Sep. 13, 2017 in corresponding U.S. Appl. No. 15/480,320 (11 pages).
Picca et al,"Semantic Domains and Supersense Tagging for Domain-Specic Ontology Learning", ACM, pp. 102-107, 2007.
Wagner et al, "Automated Planning and Creation of Simulation Experiments With a Domain Specific Ontology for Semiconductor Manufacturing AMHS", IEEE, pp. 2628-2629,2014.
Kietz et al, "Extracting a Domain-Specific Ontology from a Corporate Intranet", ACM, pp. 167-175, 2000.
Guo,"Ontology Learning and its Application in Software-Intensive Projects", IEEE, pp. 843-846, 2016.
Falbo et al, "An Ontological Approach to Domain Engineering", ACM, pp. 351-358,2002.
Guo et al, "Towards an Intelligent Domain-Specific Traceability Solution", ACM, pp. 755-765, 2014.
Wongthongtham et al, "Development of a Software Engineering Ontology for Multi-site Software Development", IEEE, pp. 1-14, 2009.
Notice of Allowance dated Feb. 12, 2016 in corresponding U.S. Appl. No. 14/858,980 (7 pages).
Holmes et al, "Semantic Interoperability Integrating and Augmenting Legacy Applications with OWL Ontologies", IEEE, pp. 1-16, 2008.
Non-Final Office Action dated Jul. 21, 2016 in corresponding U.S. Appl. No. 15/141,814 (42 pages).
Non-Final Office Action dated Aug. 26, 2016 in corresponding U.S. Appl. No. 15/093,714 (14 pages).
International Search report dated Aug. 31, 2016 in corresponding International Patent Application No. PCT/US2016/033176 (18 pages).
Final Office Action dated Sep. 27, 2016 in corresponding U.S. Appl. No. 15/093,714 (24 pages).
Kowalski, Robert et. al., "A Logic-Based Framework for Reactive Systems", RuleML'12 Proceedings of the 6th international conference on Rules on the Web: research and applications, Aug. 27, 2012, 15 pages, Springer-Verlag Berlin, Heidelberg.
Notice of Allowance dated Sep. 14, 2016 in corresponding U.S. Appl. No. 14/859,016 (15 pages).
Non-Final Office Action dated May 11, 2016 in corresponding U.S. Appl. No. 14/859,016 (15 pages).
Notice of Allowance dated Nov. 21, 2016 in corresponding U.S. Appl. No. 15/141,814 (15 pages).
Faber et al, "Linking a Domain-Specific Ontology to a General Ontology", ACM, pp, 564-569, 2011.
Siy et al., Ontology-based product line modeling and generation, 2011, 5 pages.
Quinton et al., Towards multi-cloud configurations using feature models and ontologies, Apr. 2013, 6 pages.
Notice of Allowance dated Mar. 28, 2016 in corresponding U.S. Appl. No. 14/859,032 (17 pages).
Final Office Action dated Jan. 26, 2017 in corresponding U.S. Appl. No. 15/093,714 (15 pages).
Non-Final Office Action dated Dec. 24, 2015 in corresponding U.S. Appl. No. 14/858,980 (10 pages).
Olajubu, "A Textual Domain Specific Language for Requirement Modelling", ACM, pp. 1060-1062, 2015.
Heitmann, "An Open Framework for Multi-source, Cross-domain Personalisation with Semantic Interest Graphs", ACM, pp. 313-316, 2012.
Kalibatiene et al, "On OWL/SWRL mapping to UML/OCL", ACM, pp. 58-63, 2010.
Non-Final Office Action dated Feb. 10, 2017 in corresponding U.S. Appl. No. 15/393,238 (8 pages).
Non-Final Office Action dated Mar. 21, 2017 in corresponding U.S. Appl. No. 15/424,768 (38 pages).
Non-Final Office Action dated May 11, 2017 in corresponding U.S. Appl. No. 15/480,320 (9 pages).

(56) References Cited

OTHER PUBLICATIONS

Non-Final Office Action dated Mar. 12, 2018 in related U.S. Appl. No. 15/626,963 (12 pages).
Djuric et al., "Modeling ontologies as executable domain specific languages", 2010, 10 pages.
International Search Report and Written Opinion of the International Searching Authority dated Jul. 9, 2018 in related PCT Application No. PCT/US2018/025062, 10 pages.
Lyell et al., "An ontology-based spatio-temporal data model and query language for use in GIS-type applications", 2011, 9 pages.
Maedche et al., "Managing multiple and distributed ontologies on the SemanticWeb", The VLDB Journal, 2003, pp. 286-302.
Non-Final Office Action issued in related U.S. Appl. No. 15/847,274 dated Sep. 24, 2018, 12 pages.
Zhang et al., "Formal Approach and Automated Tool for Constructing Ontology from Object-oriented Database Model", ACM, pp. 1329-1332, 2010.
Notice of Allowance issued in related U.S. Appl. No. 15/626,963 dated Aug. 3, 2018, 11 pages.

\* cited by examiner

FIG. 13

SYSTEM AND METHOD FOR PROVIDING SUPPLEMENTAL FUNCTIONALITIES TO A COMPUTER PROGRAM VIA AN ONTOLOGY INSTANCE

CROSS-REFERENCE TO RELATED APPLICATIONS

This present application is a continuation of U.S. patent application Ser. No. 15/393,238, filed Dec. 28, 2016, which is a continuation of U.S. patent application Ser. No. 14/859,016 (issued as U.S. Pat. No. 9,552,200 on Jan. 24, 2017), filed Sep. 18, 2015, which is related to (1) U.S. patent application Ser. No. 14/858,980 (issued as U.S. Pat. No. 9,335,991 on May 20, 2016), filed Sep. 18, 2015," and (2) U.S. patent application Ser. No. 14/859,032 (issued as U.S. Pat. No. 9,372,684 on Jun. 21, 2016), filed Sep. 18, 2015," each of which is additionally hereby incorporated by reference herein in its entirety.

FIELD OF THE INVENTION

The invention relates to providing ontology-configurable computer programs and, more particularly, to providing supplemental functionalities for computer programs via ontology instances.

BACKGROUND OF THE INVENTION

Application software (also referred to as an application) is generally designed to perform one or more tasks, activities, or projects on behalf of users. For example, some business applications are used by business users to perform various business functions, like measuring productivity, tracking inventory, workflow management, and executing various back-office tasks. Business applications sharing the same or similar business functions may be considered as a class of business applications, such as business process management (BPM) applications and master data management (MDM) applications. The business applications in the same class may share data models, such as the same or similar business objects (e.g., classes, objects, and relationships). In addition to its business function, each particular business application may be built based on knowledge from one or more domains of interest, such as the human resource domain, healthcare domain, technology domain, etc. For example, a new employee on-boarding application may belong to the class of BPM applications and specialize in the human resource domain.

Traditionally, data models shared by the same class of business applications are expressed by custom software modules written, for instance, in a traditional object-oriented programming language reflecting the data model as business objects. Typically, to add domain-specific knowledge to a business application, programmers write application code embodying the domain-specific knowledge in the same programming language (as the source code of the business application), or the application code is generated automatically based on some information gathered from a business analyst or a domain expert. Regardless, these typical approaches generally require changes to the application code of the business application. As such, when new code is introduced in an application, a significant amount of time and effort is generally required to ensure the integrity of the resulting application, which brings significant barriers in terms of productivity, and can propagate errors throughout a code base in an unpredictable fashion. These and other drawbacks exist.

SUMMARY OF THE INVENTION

The invention addressing these and other drawbacks relates to methods, apparatuses, and/or systems for providing ontology-configurable computer programs and/or supplemental functionalities for computer programs via ontology instances. As an example, an application (and/or a computer program thereof) may be supplemented with additional functionalities, e.g., for specializing a business application in a particular domain of interest, without having to modify the application code of the application (and/or without having to recompile such application code to recreate an "updated" version of the executable). To achieve this, for example, a business application may utilize at runtime supplemental information as at least part of its working memory.

In accordance with some embodiments described herein, a method for providing supplemental functionalities for a computer program (e.g., an executable program or other computer program) via an instance of an ontology describing a class of applications may be provided. A computer program associated with an ontology may be caused to be run. The ontology may include information indicating attributes for a set of applications. Examples of the attributes include, but are not limited to, classes, properties, and axioms. An instance of the ontology may be obtained, which corresponds to an application of the set of applications. Based on the ontology instance, supplemental information related to one or more functionalities of the application to be added to the computer program may be provided for the computer program. The supplemental information may be provided as input to the computer program. The supplemental information, at least in part, may cause the one or more functionalities of the application be made available via the executable program.

In some embodiments, the computer program may be a logic program for executing the functionalities of the application using the supplemental information. The computer program may be configurable to perform a set of tasks common to a class of business application in each of several different domains of interest. The executable program may obtain the supplemental information from working memory at runtime. The supplemental information may include metadata in a graph data structure, such as a Resource Description Framework (RDF) graph. The one or more functionalities may be made available via the executable program without recompiling the executable program.

In some embodiments, by obtaining a different instance of the ontology that corresponds to another application of the set of applications, different supplemental information related to different functionalities of the other application may be generated and provided to the computer program to enable to the different functionalities to be available via the computer program. For example, the computer program may be a business application that can be supplemented to "create" other business applications in the same class without, for example, having to modify the code of the business application or recompile an updated version of the business application.

In accordance with other aspects of the inventions, a method for providing supplemental functionalities for a computer program (e.g., an executable program or other computer program) via a domain-specific ontology and an instance of a general ontology may be provided. For example, a business application may be specialized using a domain-specific ontology by this method. A computer program may be caused to be run. A general ontology and a domain-specific ontology may be obtained. The domain-specific ontology may be associated with a domain of interest, and the general ontology can be used to interpret the domain-specific ontology or any other domain-specific ontology. An instance of the general ontology may be obtained. The general ontology instance may be based on the domain-specific ontology and correspond to an application associated with the domain of interest. Based on the general ontology instance, supplemental information related to one or more functionalities of the application to be added to the computer program may be generated for the computer program. The supplemental information may be provided as input to the computer program. The supplemental information, at least in part, may cause the one or more functionalities of the application be made available via the executable program.

In some embodiments, the computer program may be a logic program for executing the functionalities of the application using the supplemental information. The computer program may be configurable to perform a set of tasks common to a class of business application in each of several different domains of interest. The executable program may obtain the supplemental information from working memory at runtime. The supplemental information may include metadata in a graph data structure, such as an RDF graph. The one or more functionalities may be made available via the executable program without recompiling the executable program.

In some embodiments, by obtaining a different domain-specific ontology in another domain of interest and a different instance of the general ontology based on the different domain-specific ontology, different supplemental information related to different functionalities of another application may be generated and provided to the computer program to enable the different functionalities to be available via the computer program. For example, the computer program may be a business application that can be supplemented to "create" other business applications in different domains of interests without, for example, having to modify the code of the business application or recompile an updated version of the business application.

In accordance with still other aspects of the inventions, a method for providing supplemental functionalities for a computer program (e.g., an executable program or other computer program) via a domain-specific ontology and an instance of an ontology describing a class of applications may be provided. For example, a domain-specific business application that belongs to a class of business applications may be specialized by this method. A computer program associated with an ontology may be caused to be run. The ontology may include information indicating attributes for a set of applications. Examples of the attributes include, but are not limited to, classes, properties, and axioms. A domain-specific ontology may be obtained. The domain-specific ontology may be associated with a domain of interest. An instance of the ontology may be obtained. The ontology instance may be based on the domain-specific ontology and correspond to an application of the set of applications that is associated with the domain of interest. Based on the ontology instance, supplemental information related to one or more functionalities of the application to be added to the computer program may be generated for the computer program. The supplemental information may be provided as input to the computer program. The supplemental information, at least in part, may cause the one or more functionalities of the application be made available via the executable program.

In some embodiments, the computer program may be a logic program for executing the functionalities of the application using the supplemental information. The computer program may be configurable to perform a set of tasks common to a class of business application in each of several different domains of interest. The executable program may obtain the supplemental information from working memory at runtime. The supplemental information may include metadata in a graph data structure, such as an RDF graph. The one or more functionalities may be made available via the executable program without recompiling the executable program.

In some embodiments, by obtaining a different instance of the ontology that is based on the domain-specific ontology and corresponds to another application of the set of applications in the domain of interest, different supplemental information related to different functionalities of the other application may be generated and provided to the computer program to enable the different functionalities to be available via the computer program. For example, the computer program may be a business application that can be supplemented to "create" other business applications in the same class without, for example, having to modify the code of the business application or recompile an updated version of the business application.

Various other aspects, features, and advantages of the inventions will be apparent through the detailed description of the invention and the drawings attached hereto. It is also to be understood that both the foregoing general description and the following detailed description are exemplary and not restrictive of the scope of the inventions. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 13 shows an ontology describing a class of BPM applications, in accordance with some embodiments.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

To mitigate the problems described herein, the inventors had to both invent solutions and, in some cases just as importantly, recognize problems overlooked (or not yet foreseen) by others in the field of enterprise software development. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

The complexity of software, particularly in business applications, has expanded dramatically in recent years. As a result, the cost of many types of custom software has risen. It is also believed that the responsiveness of developers to changing business needs has decreased. In part, this is caused by code added to address more complex use cases and extensive testing of new versions to understand complex interactions introduced by revisions to applications.

These issues, in some cases, are mitigated by some embodiments described below. Some embodiments may separately address two aspects of an application: (1) those aspects particular to a class of business applications; and (2) those aspects particular to a domain in which an instance of the class is to be applied. In some cases, relatively flexible executable code is generated for a class of business applications, and then functionality of that code is refined with an ontology that reflects more specific aspects of a particular domain. In some cases, the ontology can be created much more efficiently than the corresponding bespoke application can be created from scratch, as the ontology can facilitate code re-use across domains in some embodiments. And in some cases, the ontology can be modified with less risk to the larger code base, often without compiling new code.

It should be emphasized, though, that several inventions are described. These inventions are independently useful, so not all embodiments mitigate all of the problems addressed above, and some embodiments provide other benefits discussed below.

Description of Example Systems

Figure 1:
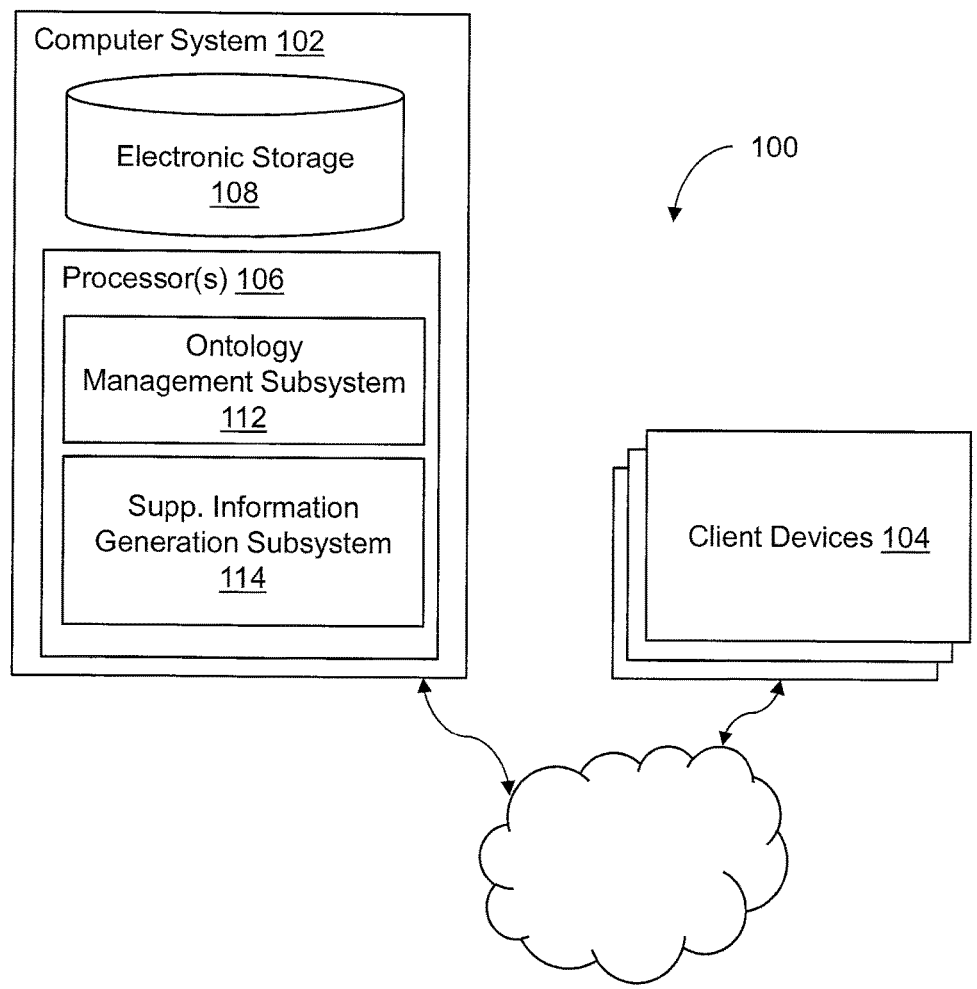
FIG. 1 shows a system for providing ontology-configurable computer programs and/or supplemental functionalities for computer programs via ontology instances, in accordance with some embodiments.

FIG. 1 shows a system 100 for providing supplemental functionalities for an executable program via ontology instances, in accordance with some embodiments. As shown in FIG. 1, the system 100 may comprise a computer system 102 (which may be multiple computer systems 102). The computer system 102 may comprise one or more physical processors 106 programmed with one or more computer program instructions and electronic storage 108, or other components. Various programs and subsystems may be implemented on the physical processors 106, including ontology management subsystem 112, supplemental information generation subsystem 114, or other components (e.g., ontology-configurable computer programs or applications, other subsystems, etc.).

In some embodiments, the computer system 102 in FIG. 1 may include communication lines or ports to enable the exchange of information with a network or other computing platforms. The computer system 102 may include a plurality of hardware, software, and/or firmware components operating together to provide the functionality attributed herein to the computer system 102. For example, the computer system 102 may be implemented by a cloud of computing platforms operating together as the computer system 102.

The electronic storage 108 may comprise non-transitory storage media that electronically stores information. The electronic storage media of the electronic storage 108 may include one or both of system storage that is provided integrally (e.g., substantially non-removable) with the computer system 102 or removable storage that is removably connectable to the computer system 102 via, for example, a port (e.g., a USB port, a firewire port, etc.) or a drive (e.g., a disk drive, etc.). The electronic storage 108 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 108 may include one or more virtual storage resources (e.g., cloud storage, a virtual private network, and/or other virtual storage resources). The electronic storage 108 may store software algorithms, information determined by the processors 106, information received from the computer system 102, information received from client computing platforms, or other information that enables the computer system 102 to function as described herein.

The processors 106 may be programmed to provide information processing capabilities in the computer system 102. As such, the processors 106 may include one or more of a digital processor, an analog processor, a digital circuit designed to process information, an analog circuit designed to process information, a state machine, and/or other mechanisms for electronically processing information. In some embodiments, the processors 106 may include a plurality of processing units. These processing units may be physically located within the same device, or the processors may represent processing functionality of a plurality of devices operating in coordination. The processors 106 may be programmed to execute computer program instructions to perform functions described herein of the subsystems 112 and 114, or other components. The processors 106 may be programmed to execute computer program instructions by software; hardware; firmware; some combination of software, hardware, or firmware; and/or other mechanisms for configuring processing capabilities on the processors 106.

A computer program on the computer system 102 may comprise an application runtime that can cause the computer system 102 to perform indicated tasks according to encoded instructions. The instructions may be any instructions (such as bytecode) for a software interpreter including, but not limited to, machine code instructions for the processors 106, scripting language source file, etc. In some cases, the instructions may be complied or interpreted instructions for which source code is not provided to the party developing ontologies. An executable (of the computer program) may be hand-coded in machine language directly or may be developed as source code in any high-level programming language or assembly language and then complied into either an executable machine code file or non-executable machine code object files. The executable program may further include a runtime system, which provides runtime language features and interactions with the runtime environment of the computer system 102. In one example, the runtime system of the executable program may be a logic program including a rule engine and a set of runtime rules that control the execution of the executable program. As an example, specialization of the executable program may be achieved by accessing supplemental information in a working memory at runtime without the need to modify the executable program (e.g., reprogramming the source code and/or recompiling the source code of the executable program). For example, functionalities of any particular application or a class of applications in a particular domain of interest may be enabled on the executable program using one or more ontologies as will be described in details below. In some embodiments, the executable program may be a logic program for executing functionalities of an application using the supplemental information.

The ontology management subsystem 112 may perform various functions with respect to different types of ontologies in different embodiments. An ontology may be a machine-processable artifact that defines and captures the relationships between concepts (classes) and objects (individuals of such classes) in some domain of interest. A logic-based ontology language allows ontologies to be specified as logical theories, meaning that it is possible to reason about the relationships between the concepts and objects that are expressed in such an ontology.

Figure 2:
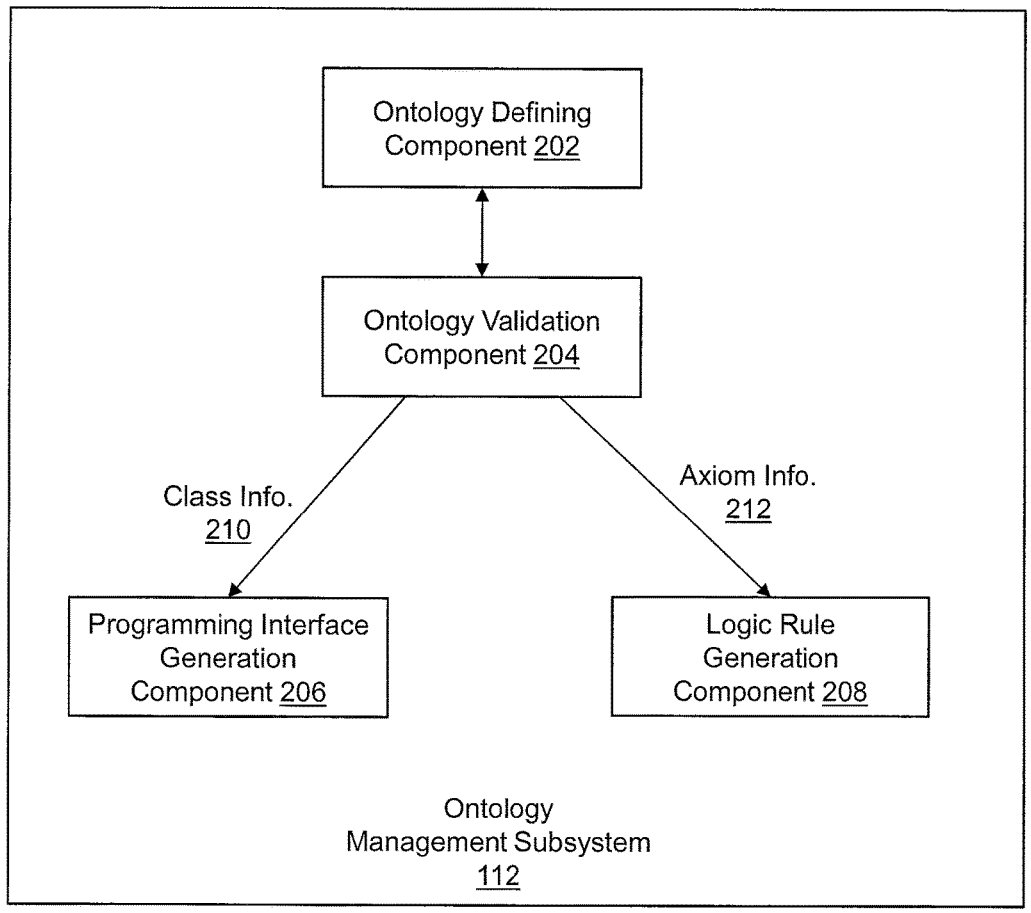
FIG. 2 shows an ontology management subsystem, in accordance with some embodiments.

Referring now to FIG. 2 (in which an ontology management subsystem 112 is shown), the ontology management subsystem 112 may include an ontology defining component 202 configured to define an ontology. The ontology may be defined in any logic-based ontology language or specific version of logic-based ontology language using any semantic editor. For example, the ontology management subsystem 112 may define and modify an ontology in Web Ontology Language DL 2.0 (OWL DL 2.0) using the Protégé ontology editor. In different embodiments, various types of ontologies may be defined by the ontology management subsystem 112, such as an ontology describing a class of applications (a.k.a. a class ontology), e.g., a BPM class ontology; an ontology that is associated with a specific domain of interest (a.k.a. a domain-specific ontology), e.g., a human resource domain ontology; and an ontology that can interpret any domain-specific ontology (a.k.a. a general ontology), e.g., a domain meta model ontology defined to describe the class structure of any domain-specific ontology. More examples of classes of applications and domains of interests are shown below in Table 1.

TABLE 1

| Class of Applications | Domain of Interest |
| --- | --- |
| Business Process Management (BPM) | Healthcare |
| Enterprise Resource Planning (ERP) | Finance and Banking |
| Claim Adjudication | Human Resource |
| Content Management System (CMS) | Manufacturing |
| Workforce Management | Distribution and Logistics |
| Customer Relationship Management (CRM) | Government and Public Sector |
| Call Center Management | Defense Industry |
| Master Data Management (MDM) | Automotive |
| Enterprise Asset Management (EAM) | Engineering |
| Supply Chain Management (SCM) | Insurance |
| Accounting Management | Media |
| Revenue Cycle Management (RCM) | Real Estate |
| Order and Fulfillment Management | Retail |
| Operation Management | Technology |
| Help Desk Management | Telecommunication |
|  | Transportation & Travel |
|  | Education |

It should be understood that multiple domains of interest (domain-specific verticals) may be applied to each class of applications. For example, each of the domains of interest listed in Table 1 that use computers may be applied to the Help Desk Management class of applications, and ERP software has applications in manufacturing, finance, banking, healthcare services, etc.

Figure 13:
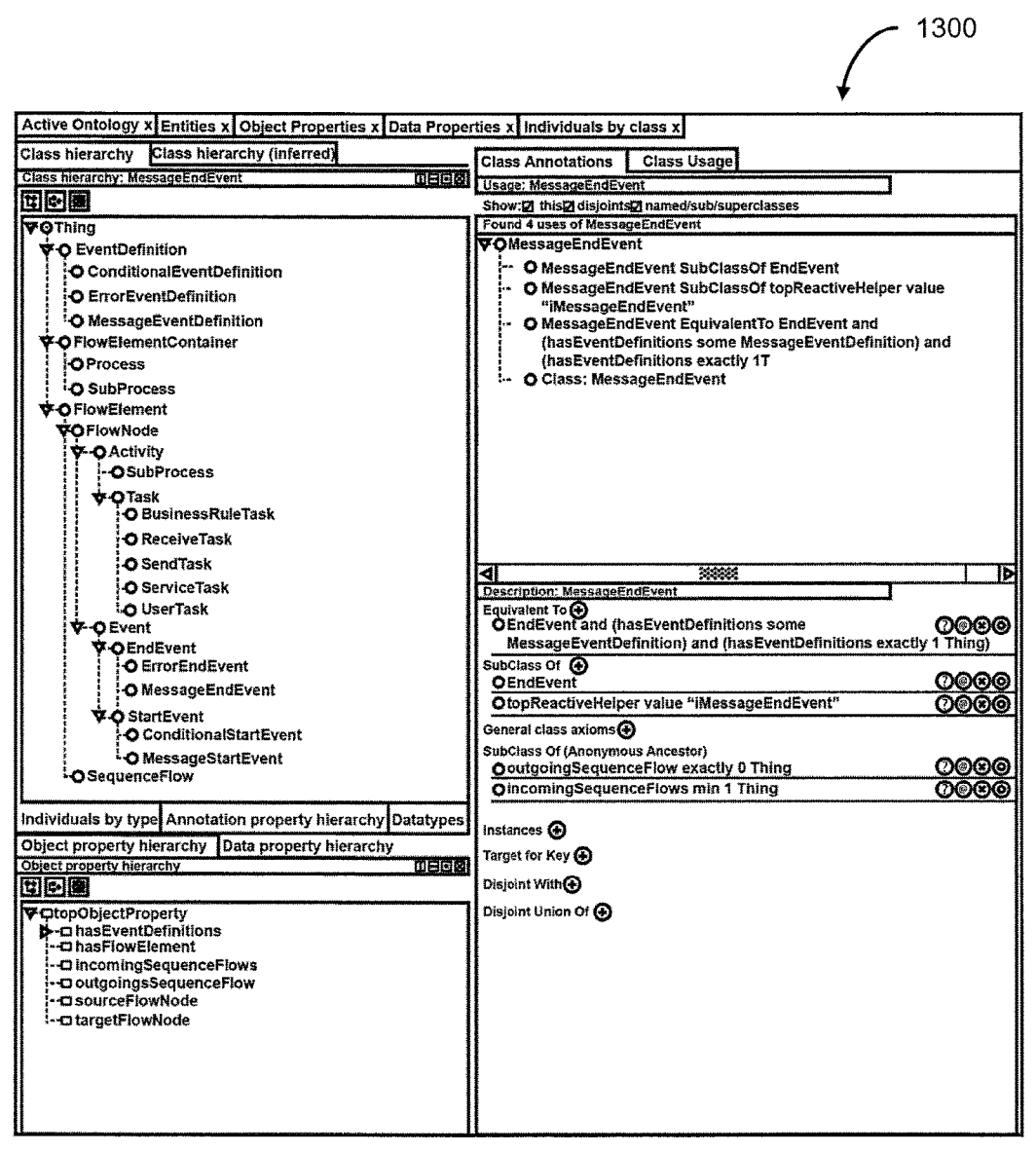
Figure 14:
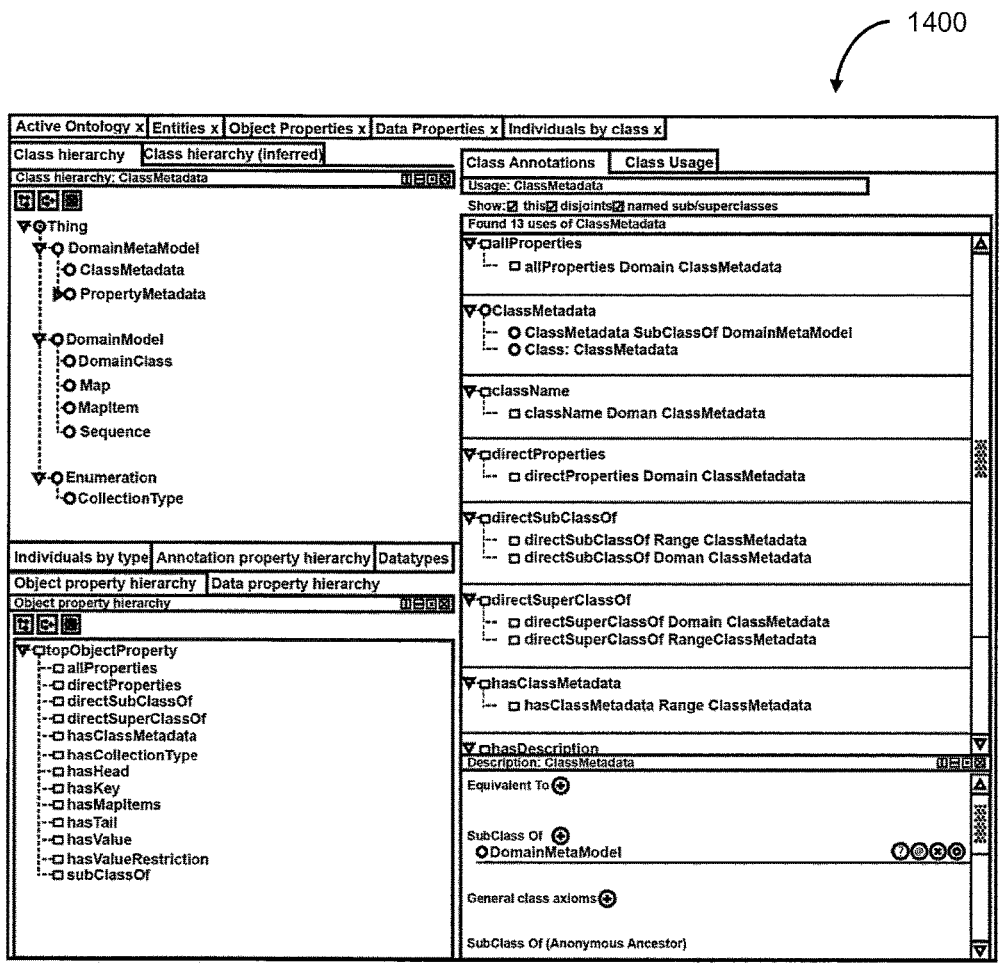
FIG. 14 shows a general ontology, in accordance with some embodiments.
Figure 15:
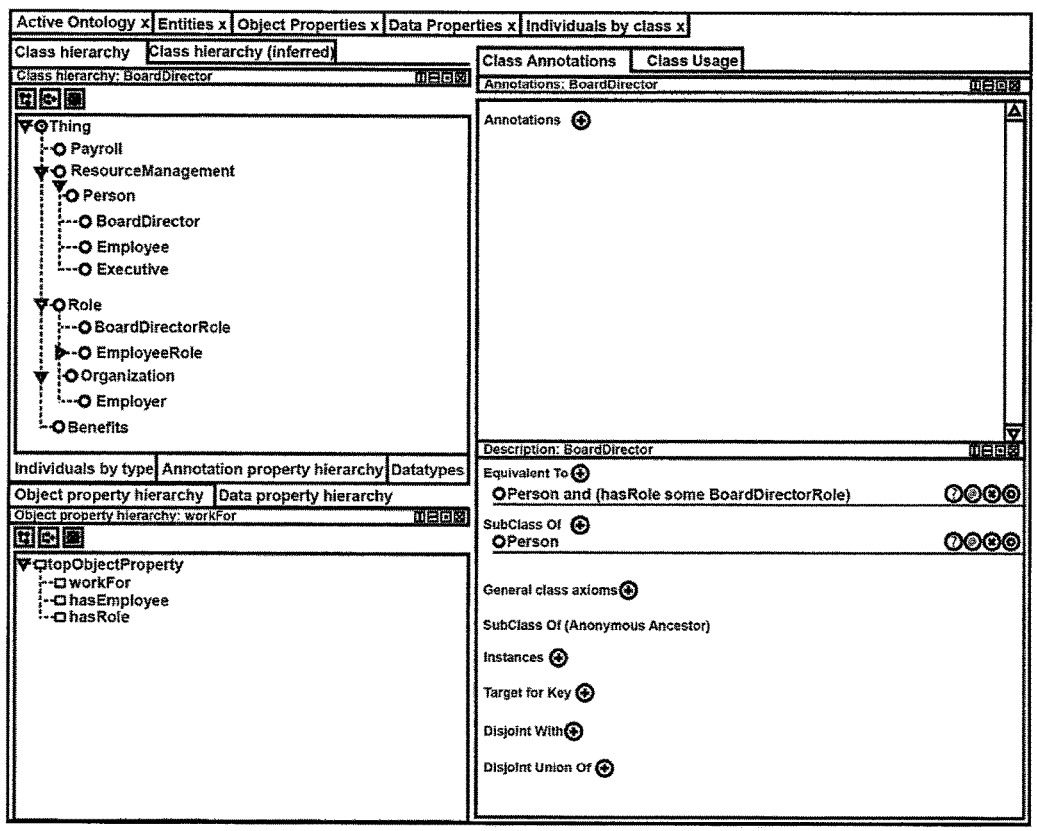
FIG. 15 shows a domain-specific ontology in the human resource domain, in accordance with some embodiments.

FIGS. 13-15 illustrate various examples of ontologies described in OWL DL 2.0 using the Protégé ontology editor. Each ontology includes information indicating various attributes, such as classes, properties, and axioms. FIG. 13 shows an extract of a class ontology 1300 describing the class of BPM applications. In this example, the BPMN 2.0 specification from the Object Management Group (OMG) (see http://www.omg.org/spec/BPMN/2.0/) is used as a guide for elaborating an ontology for the class of BPM applications. The ontology, being logic-based, embodies axioms contained the textual description of the BPMN specification. The class information, such as class hierarchy (class structure), is shown on the upper left section in FIG. 13; the property information is shown on the lower left section of FIG. 13. As an example, in FIG. 13, the axioms of class MessageEndEvent are shown in the lower right section. The first axiom is a class construct describing an equivalent class to the class MessageEndEvent: MessageEndEvent≡EndEvent and (hasEventDefinitions some MessageEventDefinition) and (hasEventDefinition exactly 1 Thing).

This axiom can be translated into plain language as: A MessageEndEvent is equivalent to EndEvent having a single EventDefinition of type MessageEventDefinition. Once the ontology is defined by the ontology defining component 202, it may be saved as a file in any suitable format, such as RDF/XML. RDF is a known data model for encoding metadata and knowledge on the Semantic Web using facts expressed as triples. For example, the definitions of the class MessageEndEvent may be described in the saved RDF/XML file as:

```
<owl:Class rdf:about="&bpmn;MessageEndEvent">
  <owl:equivalentClass>
    <owl:Class>
      <owl:intersectionOf rdf:parseType="Collection">
        <rdf:Description rdf:about="&bpmn;EndEvent"/>
        <owl:Restriction>
          <owl:onProperty
            rdf:resource="&bpmn;hasEventDefinitions"/>
          <owl:someValuesFrom
            rdf:resource="&bpmn;MessageEventDefinition"/>
        </owl:Restriction>
        <owl:Restriction>
          <owl:onProperty
            rdf:resource="&bpmn;hasEventDefinitions"/>
          <owl:cardinality
            rdf:datatype="&xsd;nonNegativeInteger">1</owl:cardinality>
        </owl:Restriction>
      </owl:intersectionOf>
    </owl:Class>
  </owl:equivalentClass>
  <rdfs:subClassOf rdf:resource="&bpmn;EndEvent"/>
  <rdfs:subClassOf>
    <owl:Restriction>
      <owl:onProperty rdf:resource="&bpmn;topReactiveHelper"/>
      <owl:hasValue>iMessageEndEvent</owl:hasValue>
    </owl:Restriction>
  </rdfs:subClassOf>
</owl:Class>
```

FIG. 14 shows an extract of a general ontology 1400 that can describe and interpret any domain-specific ontology. A domain-specific ontology may be described using metadata information. The metadata information may describe the domain-specific ontology class and property information. The structure of the metadata information may be itself described using a general ontology called the domain meta model ontology. The domain meta model ontology may not be modified and have no dependency on any domain-specific ontology. The domain meta model may become a known and explicit structure used by an executable program (e.g., an ontology-configurable executable program) to interpret the structure of the domain-specific ontology. The key classes of this general ontology in FIG. 14 include Class-Metadata and PropertyMetadata describing the structure of class and property respectively.

FIG. 15 shows an extract of a domain-specific ontology 1500 that is associated with the human resource domain (a human resource domain ontology). The human resource domain ontology may be described by instances of the domain meta model ontology shown in FIG. 14. For example, the ontology in FIG. 14 shows that a Person can be Employee, BoardDirector and Executive depending on the Role they have. It should be understood that FIGS. 13-15 show illustrative ontologies only and are by no means complete in order to describe the class of BPM applications, the domain meta model, and the human resource domain, respectively.

With respect to FIG. 2, the ontology management subsystem 112 may also include an ontology validation component 204 configured to validate any ontology and assign a freeze to the validated ontology. In some embodiments, the ontology validation component 204 may include any semantic reasoners, such as Pellet, RacerPro, FaCT++, and HermiT, for ensuring an ontology is consistent once the ontology has been defined by the ontology defining component 202. An inconsistent ontology may be an ontology that, by virtue of what has been stated in the ontology, cannot have any models, and entails everything, meaning any conclusion can be deduced. Once the ontology is complete (meaning it describes all the concepts, objects, their relationships, and axioms) and is ensured to be consistent, it may be frozen by the ontology validation component 204 such that the ontology can no longer be changed or modified. If the ontology needs to be changed, it needs to be redefined by the ontology defining component 202 as a new version of the ontology. It should be noted that any types of ontologies defined by the ontology defining component 202, e.g., class ontologies, general ontologies, and domain-specific ontologies, may be validated and frozen by the ontology validation component 204.

The ontology management subsystem 112 in FIG. 2 may further include a programming interface generation component 206 and a logic rule generation component 208. The programming interface generation component 206 may extract class information 210 from a frozen ontology and generate, based on the extracted class information 210, a programming interface to allow an executable program (e.g., an ontology-configurable executable program) to access the supplemental information via the programming interface. An ontology may be processed by a computer program to extract class information 210 including, for example, the class structure (concept hierarchy), the data properties associated with each class, and the relationships, if any, shared between classes. The class information 210 may be used by the programming interface generation component 206 to generate computer code in any programming language, such as Scala, Java™, Python, C++, C#, Ruby, etc., to be used as a programming interface for a class of applications and/or applications in a domain of interest. The programming interface referred herein may be computer code in a programming language that describes classes corresponding to the static structure of the ontology and that provides a natural interface to the executable program for accessing the supplemental information (e.g., metadata of ontology class structures) stored in a working memory at runtime.

The logic rule generation component 208 in FIG. 2 may extract axiom information 212 from a frozen ontology and generate, based on the axiom information 212, a set of logic rules. The logic rules may be used to compute entailments on the instances of an ontology. The entailments may include the inferred class hierarchy (asserted and inferred class membership of the instances) as well as be used to ensure the asserted instances are consistent with the ontology. That is, the logic rules may be used to transform ontology instances into application metadata information and used to validate ontology instances to ensure conformance of the instances with the ontology. In some embodiments, an ontology instance is frozen, and its corresponding metadata information becomes read-only once the ontology instance has been validated by the logic rules generated by the logic rule generation component 208. Depending on the type of ontology from which the logic rules are generated, the logic rules may include class logic rules generated based on a class ontology, general logic rules generated based on a general ontology, and specific logic rules generated based on a domain-specific ontology. In some embodiments, only the class logic rules and general logic rules may be used for computing entailments on ontology instances and for validating ontology instances. The logic rules may be augmented with the runtime rules of the executable program to control the execution of the executable program. For example, the specific logic rules generated based on a domain-specific ontology may be applied to the domain-specific ontology instance by the executable program at runtime.

Turning back to FIG. 1, the supplemental information generation subsystem 114 may generate supplemental information related to one or more functionalities of an application based on an instance of an ontology defined by the ontology management subsystem 112. In one use case, the instance may be from a class ontology and specify one of a class of applications (e.g., a BPM application), and the supplemental information is related to functionalities of one of the BPM applications. In another use case, the instance may be from a general ontology (e.g., a domain meta model ontology) and describe a domain-specific ontology (e.g., the human resource domain), and the supplemental information is related to functionalities of an application in the human resource domain. An ontology instance may be described in any suitable format, such as in the forms of triples in the RDF/XML format. The supplemental information generated by the supplemental information generation subsystem 114 may include metadata information transformed from the ontology instance. Additionally or optionally, the logic rules generated by the logic rule generation component 208 of the ontology management subsystem 112 may be used by the supplemental information generation subsystem 114 to infer additional metadata information as part of the supplemental information.

Figure 3:
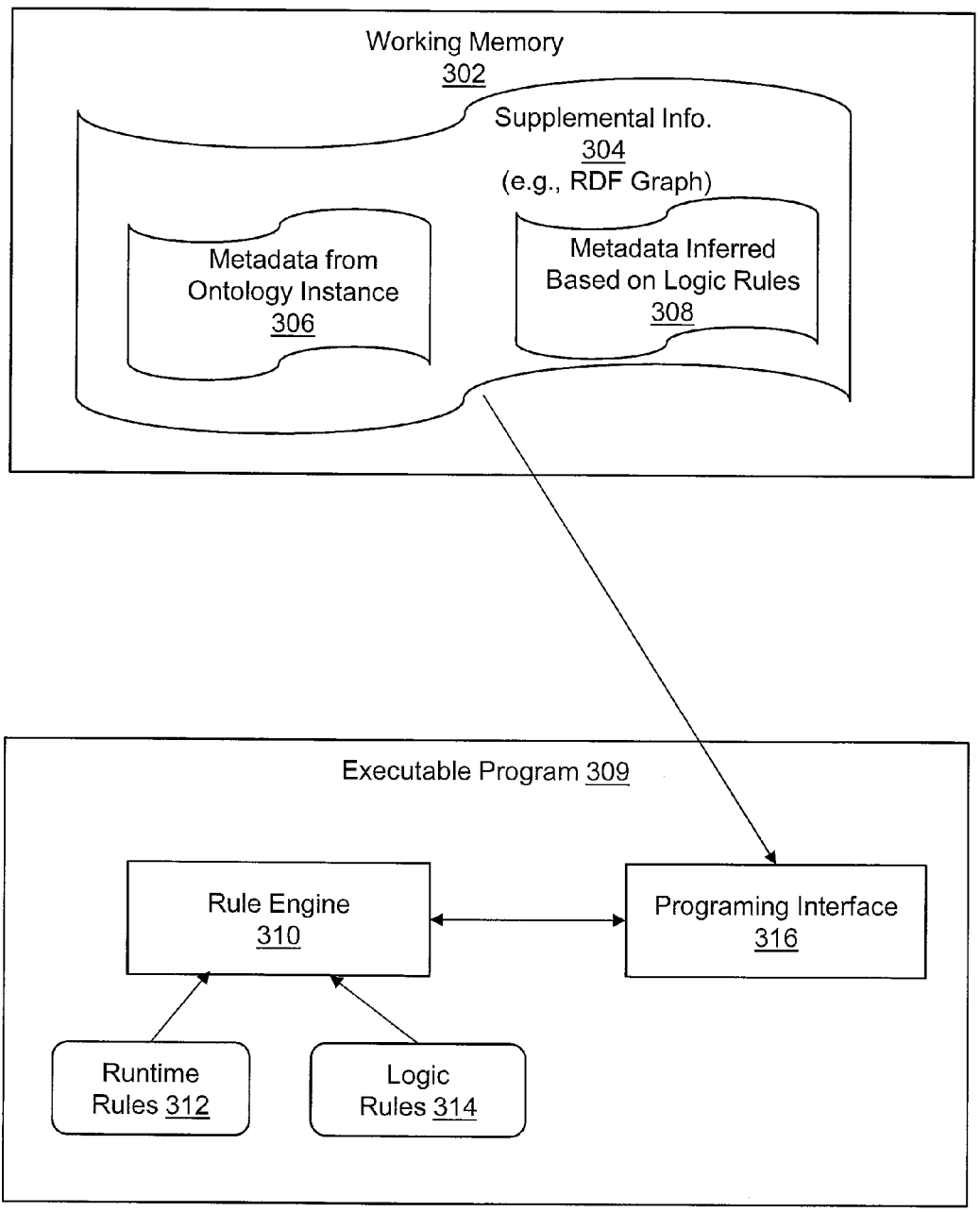
FIG. 3 shows an executable program that accesses supplemental information in a working memory at runtime, in accordance with some embodiments.

Referring to FIG. 3, in some embodiments, the supplemental information 304 includes metadata in a graph data structure, such as an RDF graph, stored in a working memory 302. The supplemental information 304 may include metadata 306 transformed directly from an ontology instance and metadata 308 inferred from an ontology instance based on the logic rules generated by the logic rule generation component 208 of the ontology management subsystem 112. For metadata 306, it may include facts, e.g., objects (or individuals) of the classes, asserted by a class ontology, which can be used to describe a particular application in the class of applications corresponding to the class ontology. Metadata 306 may include facts, e.g., objects (or individuals) of the classes, asserted by a general ontology (e.g., a domain meta model ontology) that can be used to describe and interpret any domain-specific ontology. For metadata 308, it may include entailments computed from objects in metadata 306 using the logic rules. The entailments may include the verification that the objects are consistent with the axioms of the ontology, meaning that no axioms are violated. Both metadata 306 and 308 may be augmented using the logic rules to form the supplemental information 304 that is related to functionalities of an application.

In FIG. 3, an executable program 309 may include a rule engine 310 the manipulates the supplemental information 304 in the working memory 302 at runtime via the programming interface 316 based on a set of rules including the runtime rules 312 and logic rules 314. As mentioned above, the programming interface 316 may be generated by the programming interface generation component 206 of the ontology management subsystem 112. The programming interface 316 may include computer code in a programming language describing the class structures that are used by the supplemental information 304 in the working memory 302. The executable program 309 can thus get access to the metadata 306, 308 via the programming interface 316. The logic rules 314 used by the rule engine 310 may include class logic rules, general logic rules, and specific logic rules generated from corresponding types of ontologies, each of which may be utilized for controlling the executable program 309 to access corresponding information. The runtime rules 312, on the other hand, may not alter the supplemental information 304 in any way and provide control capability to the executable program 309. The runtime rules 312 may be utilized for controlling the executable program 309 to access context information of executing the executable program 309. Accordingly, by placing different supplemental information 304 corresponding to functionalities of different applications in the working memory 302 and applying the programming interface 316 and logic rules 314 generated from the corresponding ontologies, the executable program 309 can be specialized with different functionalities without the need of adding or modifying computer code.

It should be appreciated that the description of the functionality provided by the different subsystems 112 and 114 described herein is for illustrative purposes only, and is not intended to be limiting, as any of subsystems 112 and 114 may provide more or less functionality than is described. For example, additional subsystems may be programmed to perform some or all of the functionality attributed herein to one of subsystems 112 and 114.

The system 100 may further comprise a client device 104 (or multiple client devices 104). A client device 104 may comprise any type of mobile terminal, fixed terminal, or other device. By way of example, a client device 104 may comprise a desktop computer, a notebook computer, a netbook computer, a tablet computer, a smartphone, a navigation device, an electronic book device, a gaming device, or other user device. Users may, for instance, utilize one or more client devices 104 to interact with computer system 102 or other components of system 100. The users may include administrative users such as managers or programmers who manage the subsystems 112 and 114. The users may also include customers who use ontology-configurable programs and applications derived thereof.

Attention will now be turned to a more detailed description of various embodiments comprising one or more features related to providing ontology-configurable computer programs and/or supplemental functionalities for computer programs via ontology instances. It should be noted that features described herein may be implemented separately or in combination with one another.

Functionalities Provided Via a Class Ontology Instance

Figure 4:
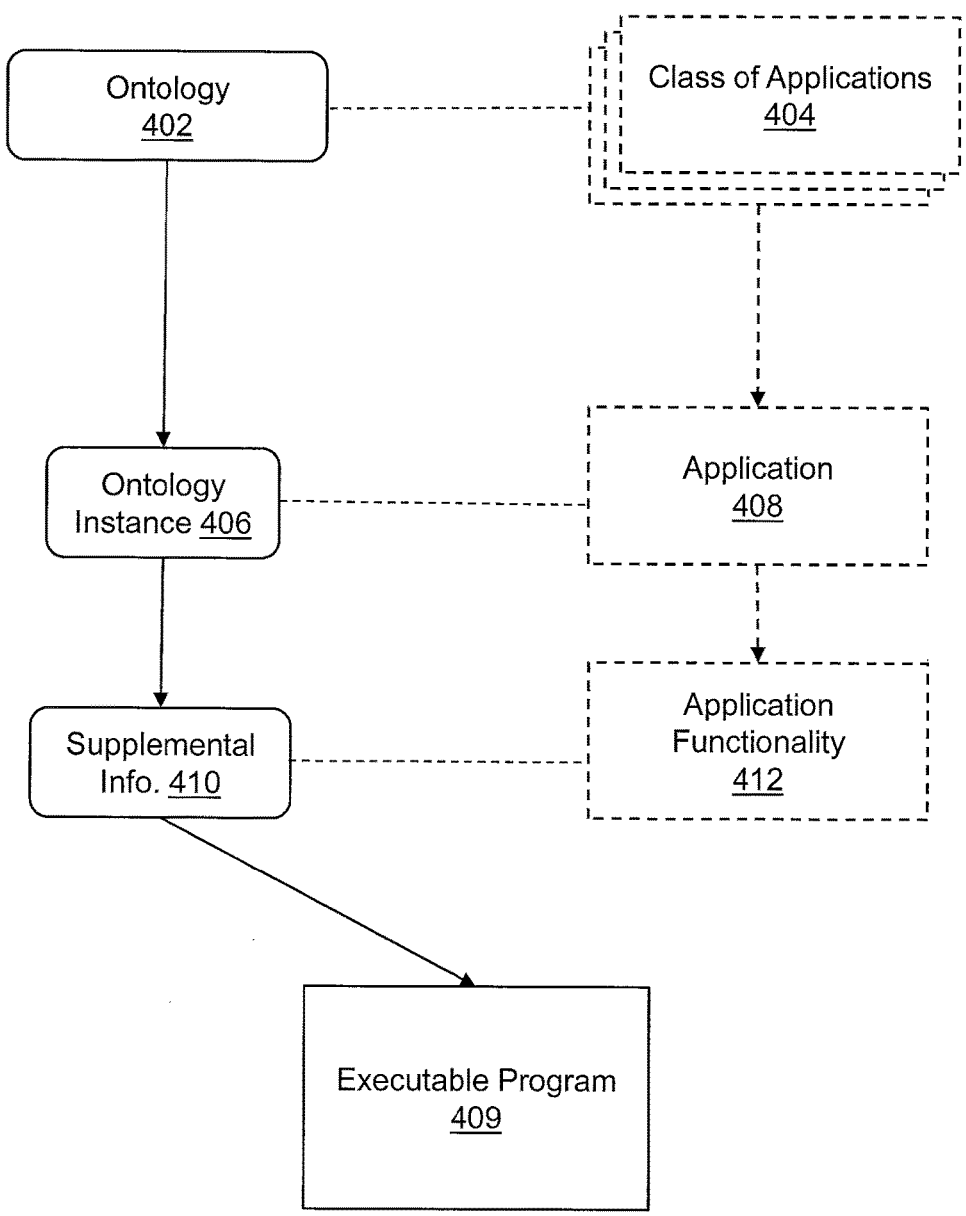
FIG. 4 shows a process of providing supplemental functionalities for a computer program via an instance of an ontology describing a class of applications, in accordance with some embodiments.
Figure 5:
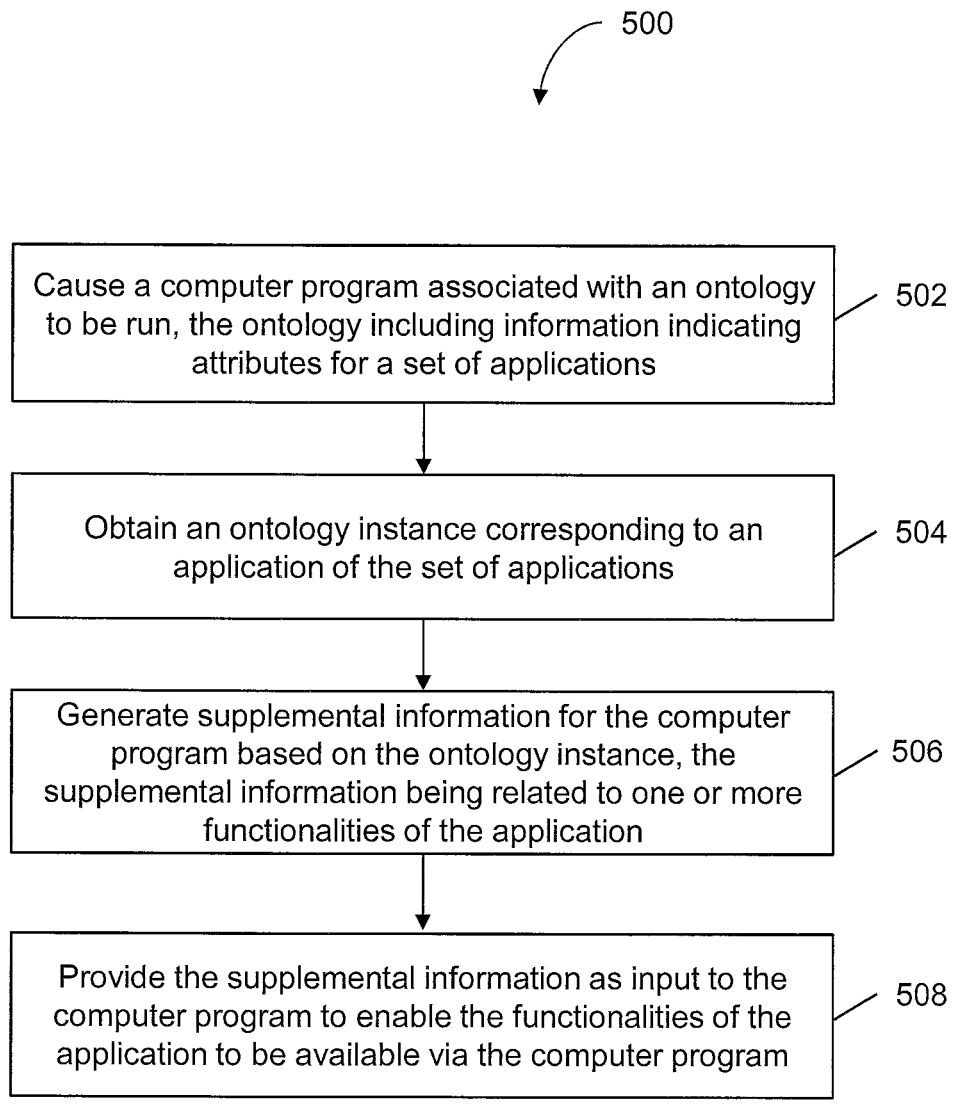
FIG. 5 is a flowchart of a method of providing supplemental functionalities for a computer program via an instance of an ontology describing a class of applications, in accordance with some embodiments.
Figure 6:
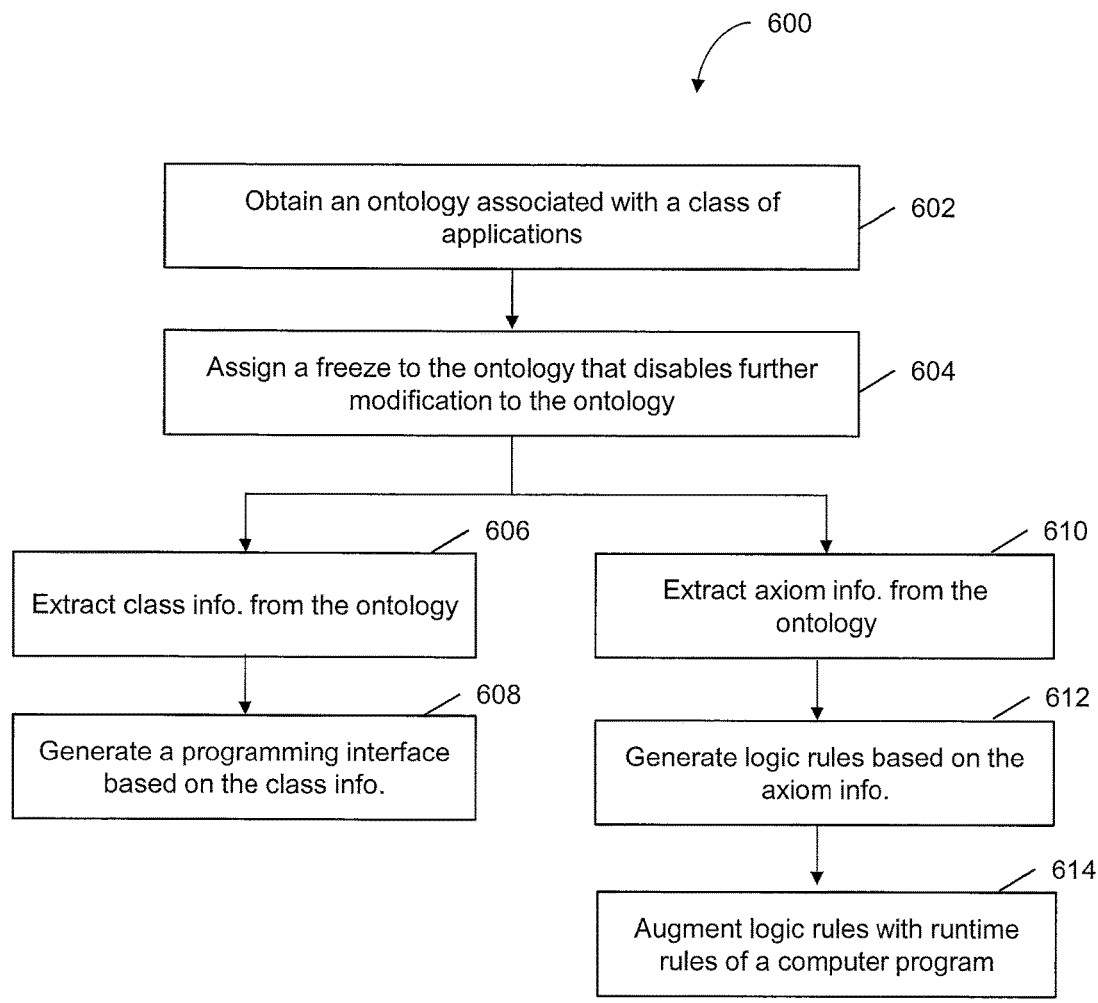
FIG. 6 is a flowchart of a method of generating a programming interface and logic rules based on an ontology describing a class of applications, in accordance with some embodiments.

FIGS. 4-6 illustrate one aspect of the invention, which can provide supplemental functionalities for an executable program via a class ontology instance. FIGS. 4-6 further describe the design and creation of a class of applications by the use of a class ontology. The ontology describes the class of applications, and, at runtime, instances of the ontology are used as metadata for specifying a particular application.

As shown in FIG. 4, an ontology 402 (a class ontology) describes a class of applications 404, such as the classes listed in Table 1. For example, a BPM class ontology may embody all of the axioms contained in the textual description of the BPMN specification. An example BPM class ontology has been described above with respect to FIG. 13. As mentioned above, both class information and axiom information may be extracted from a class ontology and used to generate the programming interface and logic rules, respectively. Following the BPM class ontology example described in FIG. 13, the BPM class ontology in the format RDF/XML may be processed by a computer program to generate classes in programming languages equivalent to the static structure of the BPM class ontology. For example, the class in Scala programming language representing the MessageEndEvent class in RDF/XML is:

```
object MessageEndEventCriteria {
  def apply(m: Model) = new MessageEndEventCriteria(m, List( (m.owl.owlResource.rdfType,
m.rn.MessageEndEvent) ))
}
class MessageEndEventCriteria(m: Model, l: List[(topengine.api.rdf.Resource,
topengine.api.rdf.Resource)]) extends topengine.api.owl.Criteria(l) {
  def addTopReactiveHelper(o: String) = new MessageEndEventCriteria(m,
(m.rn.topReactiveHelper, m.rdfSession.createLiteral(o)) :: criteria)
  def addHasEventDefinitions(o: EventDefinition) = new MessageEndEventCriteria(m,
(m.rn.hasEventDefinitions, o.s) :: criteria)
  def addIncomingSequenceFlows(o: SequenceFlow) = new MessageEndEventCriteria(m,
(m.rn.incomingSequenceFlows, o.s) :: criteria)
  def addOutgoingSequenceFlow(o: SequenceFlow) = new MessageEndEventCriteria(m,
(m.rn.outgoingSequenceFlow, o.s) :: criteria)
}
object MessageEndEvent {
  def apply(m: Model, s: topengine.api.rdf.Resource) = {
    new MessageEndEventImpl(m, m.createInstanceOf(s, m.rn.MessageEndEvent))
  }
  def createInstance(m: Model) = new MessageEndEventImpl(m,
m.createInstanceOf(m.rn.MessageEndEvent))
  def createNamedInstance(m: Model, name: String) = new MessageEndEventImpl(m,
m.createNamedInstanceOf(name, m.rn.MessageEndEvent))
  def asMessageEndEvent(m: Model, s: topengine.api.rdf.Resource): Option[MessageEndEvent]
= {
    if(m.isInstanceOf(s, m.rn.MessageEndEvent)) Some(MessageEndEvent(m, s))
    else None
  }
  def find(m: Model): Iterable[MessageEndEvent] =
m.findCustomSubject(m.rn.MessageEndEvent, MessageEndEventCriteria(m), { r =>
MessageEndEvent.asMessageEndEvent(m.bpmn, r) match {
    case Some(c) => c
    case None => throw topengine.api.TopEngineException("MessageEndEvent.find has
subject(s) that are not type MessageEndEvent") }})
  def find(m: Model, criteria: MessageEndEventCriteria): Iterable[MessageEndEvent] =
m.findCustomSubject(m.rn.MessageEndEvent, criteria, { r =>
MessageEndEvent.asMessageEndEvent(m.bpmn, r) match {
    case Some(c) => c
    case None => throw topengine.api.TopEngineException("MessageEndEvent.find has
subject(s) that are not type MessageEndEvent") }})
}
trait MessageEndEvent extends EndEvent {
  val s: topengine.api.rdf.Resource
  // Properties
}
class MessageEndEventImpl(m: Model, s: topengine.api.rdf.Resource) extends
topengine.api.owl.ThingImpl(m.owl, s) with MessageEndEvent {
  // Base classes
  def asEndEvent: EndEvent = EndEvent(m.bpmn, s)
  def asEvent: Event = Event(m.bpmn, s)
  def asFlowNode: FlowNode = FlowNode(m.bpmn, s)
  def asFlowElement: FlowElement = FlowElement(m.bpmn, s)
  def asThing: topengine.api.owl.Thing = topengine.api.owl.Thing(m.owl, s)
  // Properties
  // topReactiveHelper is a Datatype Functional Property, range is String
  def topReactiveHelper: Option[String] = m.hasObjectAsLiteral(s, m.rn.topReactiveHelper)
map { _.getString }
  def setTopReactiveHelper(o: String) = m.setFunctionalPropertyValue(s,
m.rn.topReactiveHelper, o)
  // hasEventDefinitions is an Object Property
  def hasEventDefinitions: Iterable[EventDefinition] = m.rdfSession.getCustomObjects(s,
m.rn.hasEventDefinitions, { r => EventDefinition.asEventDefinition(m.bpmn, r) match {
    case Some(c) => c
    case None => throw
topengine.api.TopEngineException("MessageEndEvent.hasEventDefinitions has object(s) that
are not type EventDefinition") }})
  def addHasEventDefinitions(o: EventDefinition) = m.addPropertyValue(s,
m.rn.hasEventDefinitions, o.s)
  def removeHasEventDefinitions(o: EventDefinition) = m.removePropertyValue(s,
m.rn.hasEventDefinitions, o.s)
  def removeAllHasEventDefinitions = m.removePropertyValue(s, m.rn.hasEventDefinitions)
  // incomingSequenceFlows is an Object Property
  def incomingSequenceFlows: Iterable[SequenceFlow] = m.rdfSession.getCustomObjects(s,
m.rn.incomingSequenceFlows, { r => SequenceFlow.asSequenceFlow(m.bpmn, r) match {
    case Some(c) => c
    case None => throw
topengine.api.TopEngineException("MessageEndEvent.incomingSequenceFlows has object(s)
that are not type SequenceFlow") }})
  def addIncomingSequenceFlows(o: SequenceFlow) = m.addPropertyValue(s,
m.rn.incomingSequenceFlows, o.s)
```

-continued

```
    def removeIncomingSequenceFlows(o: SequenceFlow) = m.removePropertyValue(s,
m.rn.incomingSequenceFlows, o.s)
    def removeAllIncomingSequenceFlows = m.removePropertyValue(s,
m.rn.incomingSequenceFlows)
    // outgoingSequenceFlow is an Object Property
    def outgoingSequenceFlow: Iterable[SequenceFlow] = m.rdfSession.getCustomObjects(s,
m.rn.outgoingSequenceFlow, { r => SequenceFlow.asSequenceFlow(m.bpmn, r) match {
        case Some(c) => c
        case None => throw
topengine.api.TopEngineException("MessageEndEvent.outgoingSequenceFlow has object(s) that
are not type SequenceFlow") }})
    def addOutgoingSequenceFlow(o: SequenceFlow) = m.addPropertyValue(s,
m.rn.outgoingSequenceFlow, o.s)
    def removeOutgoingSequenceFlow(o: SequenceFlow) = m.removePropertyValue(s,
m.rn.outgoingSequenceFlow, o.s)
    def removeAllOutgoingSequenceFlow = m.removePropertyValue(s,
m.rn.outgoingSequenceFlow)
    override def equals(o: Any) = o match {
        case that: topengine.api.owl.ThingImpl => that.s.key == s.key
        case _ => false
    }
    override def hashCode = s.key
}
```

The generated class provides a natural interface to executable programs written in Scala programming language for accessing supplemental information (e.g., metadata) stored in a working memory. The class MessageEndEventImpl is the generated implementation class that performs the access to the underlying supplemental information, for example, in RDF graph.

The generated classes in the programming language may capture the static data model embodied by the ontology. The axioms may be taken into consideration by logic rules that are applied to the supplemental information continuously as data is added to or subtracted from the supplemental information. The logic rules may be generated automatically from the BPM class ontology described in FIG. 13. For example, the logic rules corresponding to the class equivalence axiom for the class MessageEndEvent are:

```
# bpmn:MessageEndEvent is equivalent to the following conjunction:
    [n=bpmn52, s=100]:
    (?s rdf:type bpmn:EndEvent).
    (?s bpmn:hasEventDefinitions ?o).(?o rdf:type
    bpmn:MessageEventDefinition).
    [?s test_cardinality bpmn__res:8]
    ->
    (?s rdf:type bpmn:MessageEndEvent)
```

Back to FIG. 4, an instance 406 of the class ontology 402 may be obtained from the class ontology 402. The ontology instance 406 may specify an application 408 in the class of applications 404. Following the BPM class ontology example described in FIG. 13, a sample human resource employee on-boarding process may be specified as an instance of the example BPM class ontology, and thus, the employee on-boarding application is a member of the class of BPM applications. The on-boarding process described herein is for illustrative purposes only and is not meant to be complete. The process includes an instance of bpmn:Process class having a single bpmn:FlowElement of type bpmn:StartEvent. This start event has an event definition of type bpmn:MessageEventDefinition. The event definition defines the mapping elements for the message initiating the business process. In this example, it defines the mapping for the first and last name of the employee. The example employee on-boarding process may be expressed as individuals of the example BPM class ontology and can be expressed as an OWL document in the RDF/XML format:

```
<!-- http://owl.reactivecore.com/topreactive/sample/bpmn/acme-bpmn-
hr#iAcmeOnboardingProcess -->
<owl:NamedIndividual
    rdf:about="&acme-bpmn-hr;iAcmeOnboardingProcess">
    <rdf:type rdf:resource="&bpmn;Process"/>
    <bpmn:hasFlowElement
    rdf:resource="&acme-bpmn-hr;iAcmeStartOnboarding"/>
</owl:NamedIndividual>
<!-- http://owl.reactivecore.com/topreactive/sample/bpmn/acme-bpmn-
hr#iAcmeStartOnboarding -->
<owl:NamedIndividual
    rdf:about="&acme-bpmn-hr;iAcmeStartOnboarding">
    <rdf:type rdf:resource="&bpmn;StartEvent"/>
    <bpmn:hasEventDefinitions rdf:resource="&acme-bpmn-
hr;iStartOnboardingMessageDefinition"/>
</owl:NamedIndividual>
<!-- http://owl.reactivecore.com/topreactive/sample/bpmn/acme-bpmn-
hr#iFirstNameMappingElm -->
<owl:NamedIndividual
    rdf:about="&acme-bpmn-hr;iFirstNameMappingElm">
    <rdf:type rdf:resource="&bpmn;MappingElement"/>
    <bpmn:sourceFieldName>GivenName</bpmn:sourceFieldName>
    <bpmn:targetFieldName>hr:firstName</bpmn:targetFieldName>
    <bpmn:targetFieldType>xsd:string</bpmn:targetFieldType>
    <bpmn:sourceFieldType>xsd:string</bpmn:sourceFieldType>
</owl:NamedIndividual>
<!-- http://owl.reactivecore.com/topreactive/sample/bpmn/acme-bpmn-
hr#iLastNameMappingElm -->
<owl:NamedIndividual
    rdf:about="&acme-bpmn-hr;iLastNameMappingElm">
    <rdf:type rdf:resource="&bpmn;MappingElement"/>
    <bpmn:targetFieldType>xsd:string</bpmn:targetFieldType>
    <bpmn:targetFieldName>hr:lastName</bpmn:targetFieldName>
    <bpmn:sourceFieldName>FamilyName</bpmn:sourceFieldName>
    <bpmn:sourceFieldType>xsd:string</bpmn:sourceFieldType>
</owl:NamedIndividual>
<!-- http://owl.reactivecore.com/topreactive/sample/bpmn/acme-bpmn-
hr#iStartOnboardingMessageDefinition -->
<owl:NamedIndividual
    rdf:about="&acme-bpmn-hr;iStartOnboardingMessageDefinition">
    <rdf:type rdf:resource="&bpmn;MessageEventDefinition"/>
    <bpmn:hasEventDefinitions
    rdf:resource="&acme-bpmn-hr;iFirstNameMappingElm"/>
    <bpmn:hasEventDefinitions
    rdf:resource="&acme-bpmn-hr;iLastNameMappingElm"/>
</owl:NamedIndividual>
```

In FIG. 4, supplemental information 410 may be generated based on the ontology instance 406. The supplemental information 410 may be related to functionalities 412 of the application 408 in the class of applications 404. As mentioned above with respect to FIG. 3, the supplemental information 410 may include metadata transformed from the ontology instance 406 and metadata inferred from the ontology instance 406 using logic rules generated based on the class ontology 402. The supplemental information 410 may be provided as input to an executable program 409 at runtime so as to enable the application functionalities 412 to be available via the executable program 409. As mentioned above with respect to FIG. 3, the programming interface generated based on the class ontology 402 may be provided to the executable program 409 for accessing the supplemental information 410 in the working memory at runtime.

Following the BPM class ontology example described in FIG. 13, the ontology instance 406 defining the employee on-boarding process may be expressed as triples in the working memory:

At runtime, the executable program 409 may be using the BPM definition above along with the corresponding generated logic rules to have a complete definition of the metadata defining the employee on-boarding application.

In order to increase the runtime performance of the executable program 409 with the supplemental functionalities, it is possible to augment the ontology instance 406 with entailments computed by the logic rules generated based on the class ontology 402 to have more comprehensive supplemental information. As an example, the employee on-boarding process may be augmented with entailments of the BPM

```
(acme-bpmn-hr:iAcmeOnboardingProcess, rdf:type, bpmn:Process)
(acme-bpmn-hr:iAcmeOnboardingProcess, rdf:type, owl:NamedIndividual)
(acme-bpmn-hr:iAcmeOnboardingProcess, bpmn:hasFlowElement, acme-bpmn-
hr:iAcmeStartOnboarding)
(acme-bpmn-hr:iAcmeStartOnboarding, rdf:type, bpmn:StartEvent)
(acme-bpmn-hr:iAcmeStartOnboarding, rdf:type, owl:NamedIndividual)
(acme-bpmn-hr:iAcmeStartOnboarding, bpmn:hasEventDefinitions, acme-bpmn-
hr:iStartOnboardingMessageDefinition)
(acme-bpmn-hr:iStartOnboardingMessageDefinition, rdf:type, bpmn:MessageEventDefinition)
(acme-bpmn-hr:iStartOnboardingMessageDefinition, rdf:type, owl:NamedIndividual)
(acme-bpmn-hr:iStartOnboardingMessageDefinition, bpmn:hasEventDefinitions, acme-bpmn-
hr:iFirstNameMappingElm)
(acme-bpmn-hr:iStartOnboardingMessageDefinition, bpmn:hasEventDefinitions, acme-bpmn-
hr:iLastNameMappingElm)
(acme-bpmn-hr:iFirstNameMappingElm, rdf:type, bpmn:MappingElement)
(acme-bpmn-hr:iFirstNameMappingElm, rdf:type, owl:NamedIndividual)
(acme-bpmn-hr:iFirstNameMappingElm, bpmn:sourceFieldName, "GivenName")
(acme-bpmn-hr:iFirstNameMappingElm, bpmn:sourceFieldType, "xsd:string")
(acme-bpmn-hr:iFirstNameMappingElm, bpmn:targetFieldName, "hr:firstName")
(acme-bpmn-hr:iFirstNameMappingElm, bpmn:targetFieldType, "xsd:string")
(acme-bpmn-hr:iLastNameMappingElm, rdf:type, bpmn:MappingElement)
(acme-bpmn-hr:iLastNameMappingElm, rdf:type, owl:NamedIndividual)
(acme-bpmn-hr:iLastNameMappingElm, bpmn:sourceFieldName, "FamilyName")
(acme-bpmn-hr:iLastNameMappingElm, bpmn:sourceFieldType, "xsd:string")
(acme-bpmn-hr:iLastNameMappingElm, bpmn:targetFieldName, "hr:lastName")
(acme-bpmn-hr:iLastNameMappingElm, bpmn:targetFieldType, "xsd:string")
``` class ontology using the generated logic rules to obtain the following supplemental information:

```
(acme-bpmn-hr:iAcmeOnboardingProcess, rdf:type, owl:Thing)
(acme-bpmn-hr:iAcmeOnboardingProcess, rdf:type, bpmn:FlowElementContainer)
(acme-bpmn-hr:iAcmeOnboardingProcess, rdf:type, bpmn:Process)
(acme-bpmn-hr:iAcmeOnboardingProcess, rdf:type, owl:NamedIndividual)
(acme-bpmn-hr:iAcmeOnboardingProcess, bpmn:hasFlowElement, acme-bpmn-
hr:iAcmeStartOnboarding)
(acme-bpmn-hr:iAcmeStartOnboarding, rdf:type, owl:Thing)
(acme-bpmn-hr:iAcmeStartOnboarding, rdf:type, bpmn:Event)
(acme-bpmn-hr:iAcmeStartOnboarding, rdf:type, bpmn:FlowElement)
(acme-bpmn-hr:iAcmeStartOnboarding, rdf:type, bpmn:FlowNode)
(acme-bpmn-hr:iAcmeStartOnboarding, rdf:type, bpmn:MessageStartEvent)
(acme-bpmn-hr:iAcmeStartOnboarding, rdf:type, bpmn:StartEvent)
(acme-bpmn-hr:iAcmeStartOnboarding, rdf:type, owl:NamedIndividual)
(acme-bpmn-hr:iAcmeStartOnboarding, bpmn:hasEventDefinitions, acme-bpmn-
hr:iStartOnboardingMessageDefinition)
(acme-bpmn-hr:iAcmeStartOnboarding, bpmn:hasMessageEventDefinitions, acme-bpmn-
hr:iStartOnboardingMessageDefinition)
(acme-bpmn-hr:iAcmeStartOnboarding, bpmn:topReactiveHelper, "iMessageStartEvent")
(acme-bpmn-hr:iAcmeStartOnboarding, top:consistent_on, bpmn:hasEventDefinitions)
(acme-bpmn-hr:iStartOnboardingMessageDefinition, rdf:type, owl:Thing)
(acme-bpmn-hr:iStartOnboardingMessageDefinition, rdf:type, bpmn:EventDefinition)
(acme-bpmn-hr:iStartOnboardingMessageDefinition, rdf:type, bpmn:MessageEventDefinition)
(acme-bpmn-hr:iStartOnboardingMessageDefinition, rdf:type, owl:NamedIndividual)
(acme-bpmn-hr:iStartOnboardingMessageDefinition, bpmn:hasEventDefinitions, acme-
```

```
bpmn-hr:iFirstNameMappingElm)
(acme-bpmn-hr:iStartOnboardingMessageDefinition, bpmn:hasEventDefinitions, acme-
bpmn-hr:iLastNameMappingElm)
(acme-bpmn-hr:iFirstNameMappingElm, rdf:type, owl:Thing)
(acme-bpmn-hr:iFirstNameMappingElm, rdf:type, bpmn:SupportingElement)
(acme-bpmn-hr:iFirstNameMappingElm, rdf:type, bpmn:MappingElement)
(acme-bpmn-hr:iFirstNameMappingElm, rdf:type, owl:NamedIndividual)
(acme-bpmn-hr:iFirstNameMappingElm, bpmn:sourceFieldName, "GivenName")
(acme-bpmn-hr:iFirstNameMappingElm, bpmn:sourceFieldType, "xsd:string")
(acme-bpmn-hr:iFirstNameMappingElm, bpmn:targetFieldName, "hr:firstName")
(acme-bpmn-hr:iFirstNameMappingElm, bpmn:targetFieldType, "xsd:string")
(acme-bpmn-hr:iLastNameMappingElm, rdf:type, owl:Thing)
(acme-bpmn-hr:iLastNameMappingElm, rdf:type, bpmn:SupportingElement)
(acme-bpmn-hr:iLastNameMappingElm, rdf:type, bpmn:MappingElement)
(acme-bpmn-hr:iLastNameMappingElm, rdf:type, owl:NamedIndividual)
(acme-bpmn-hr:iLastNameMappingElm, bpmn:sourceFieldName, "FamilyName")
(acme-bpmn-hr:iLastNameMappingElm, bpmn:sourceFieldType, "xsd:string")
(acme-bpmn-hr:iLastNameMappingElm, bpmn:targetFieldName, "hr:lastName")
(acme-bpmn-hr:iLastNameMappingElm, bpmn:targetFieldType, "xsd:string")
```

It is noted that the triples in bold are the inferred entailments (metadata), while the rest of the triples are metadata transformed from the BPM ontology instance.

The supplemental information with augmented metadata contains additional information. For example, the named individual acme-bpmn-hr:iAcmeStartOnboarding is not only a bpmn:StartEvent as the asserted facts indicated, but also of type bpmn:MessageStartEvent as a consequence of the equivalent class definition present in the ontology. This supplemental information corresponding to the employee on-boarding application functionalities may be stored in the working memory and become the metadata information used by the executable program 409 at runtime. As a result, in some embodiments, the generated logic rules may no longer be needed by the executable program 409 once the metadata information is augmented with the inferred entailments. It may be needed when a new application is defined using a new instance of the BPM class ontology.

FIG. 5 is a flowchart 500 of a method of providing supplemental functionalities for a computer program via ontology instances, in accordance with some embodiments.

In an operation 502, a computer program associated with an ontology may be caused to be run. The ontology may include information indicating attributes for a set of applications (e.g., a class of BPM application). Operation 502 may be performed by one or more processors that are the same as or similar to the processors 106, in accordance with one or more embodiments.

In an operation 504, an instance of the ontology may be obtained. The ontology instance may correspond to an application of the set of applications. Operation 504 may be performed by an ontology management subsystem that is the same as or similar to the ontology management subsystem 112, in accordance with one or more embodiments.

In an operation 506, supplemental information for the computer program may be generated based on the ontology instance. The supplemental information may be related to functionalities of the application. Operation 506 may be performed by a supplemental information generation subsystem that is the same as or similar to the supplemental information generation subsystem 114, in accordance with one or more embodiments.

In an operation 508, the supplemental information may be provided as input to the computer program to enable the functionalities of the application to be available via the computer program. Operation 508 may be performed by one or more processors that are the same as or similar to the processors 106, in accordance with one or more embodiments.

It should be understood that in some embodiments, operations 504-508 may be repeated to enable different functionalities of another application in the set of application to be available via the computer program. For example, another ontology instance corresponding to the other application may be obtained, and another supplemental information related to the different functionalities may be generated based on the other ontology instance and provided as input to the computer program.

FIG. 6 is a flowchart 600 of a method of generating a programming interface and logic rules based on a class ontology, in accordance with some embodiments.

In an operation 602, an ontology associated with a class of applications may be obtained. Operation 602 may be performed by an ontology defining component that is the same as or similar to the ontology defining component 202, in accordance with one or more embodiments.

In an operation 604, a freeze may be assigned to the ontology that disables further modification of the ontology. In some embodiments, the freeze may be assigned once the ontology has been completed and validated to ensure the consistency of the ontology. Operation 604 may be performed by an ontology validation component that is the same as or similar to the ontology validation component 204, in accordance with one or more embodiments.

In an operation 606, class information may be extracted from the ontology. The class information may include, for example, class structures, data properties associated with each class, and the relationships between classes. Operation 606 may be performed by a programming interface generation component that is the same as or similar to the programming interface generation component 206, in accordance with one or more embodiments.

In an operation 608, a programming interface may be generated based on the class information. The programming interface may be in the form of computer code in a programming language and may be used by a computer program (e.g., the computer program of FIG. 5) for accessing metadata information stored in the working memory. Operation 608 may be performed by a programming interface generation component that is the same as or similar to the programming interface generation component 206, in accordance with one or more embodiments.

In an operation 610, axiom information may be extracted from the ontology. Operation 610 may be performed by a logic rule generation component that is the same as or similar to the logic rule generation component 208, in accordance with one or more embodiments.

In an operation 612, logic rules may be generated based on the axiom information. The logic rules may be used to infer additional metadata, e.g., entailments on the objects of the ontology. Operation 612 may be performed by a logic rule generation component that is the same as or similar to the logic rule generation component 208, in accordance with one or more embodiments.

In an operation 614, logic rules may be augmented with runtime rules of the computer program. The augmented rules may be used for executing the computer program at runtime. Operation 614 may be performed by a logic rule generation component that is the same as or similar to the logic rule generation component 208, in accordance with one or more embodiments.

Functionalities Provided Via Domain-Specific and General Ontology Instances

Figure 7:
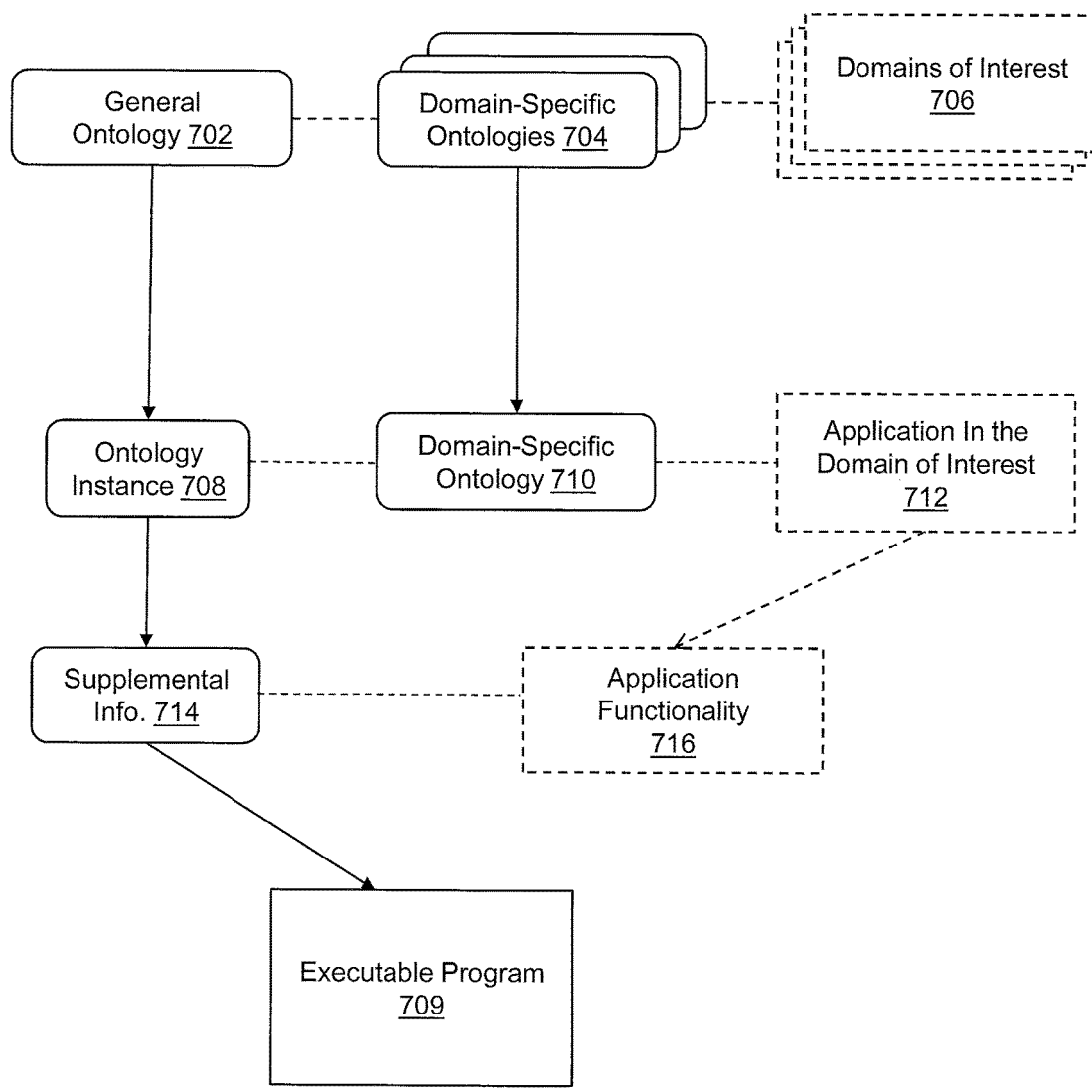
FIG. 7 shows a process of providing supplemental functionalities for a computer program via a domain-specific ontology and an instance of a general ontology, in accordance with some embodiments.
Figure 8:
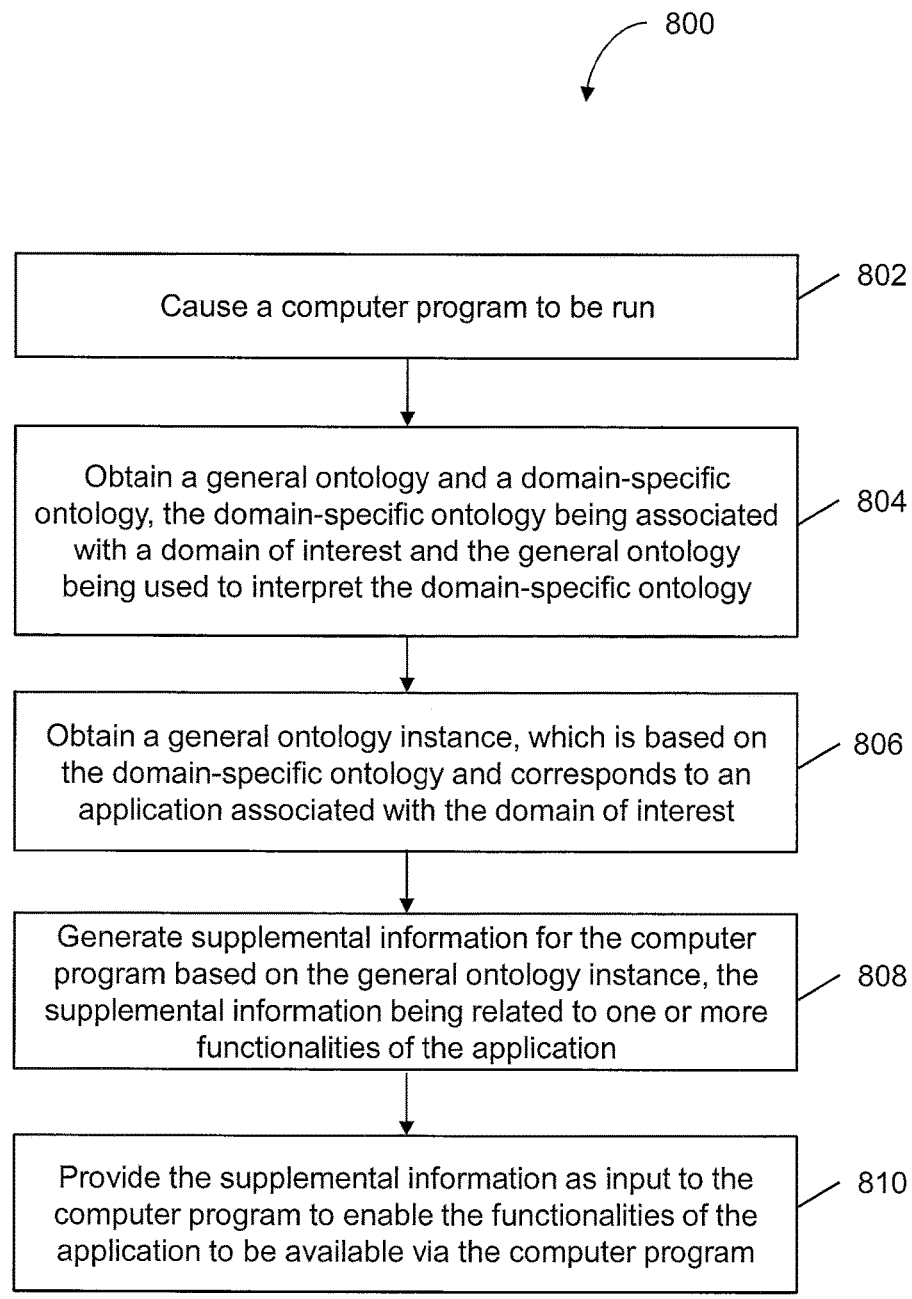
FIG. 8 is a flowchart of a method of providing supplemental functionalities for a computer program via a domain-specific ontology and an instance of a general ontology, in accordance with some embodiments.
Figure 9:
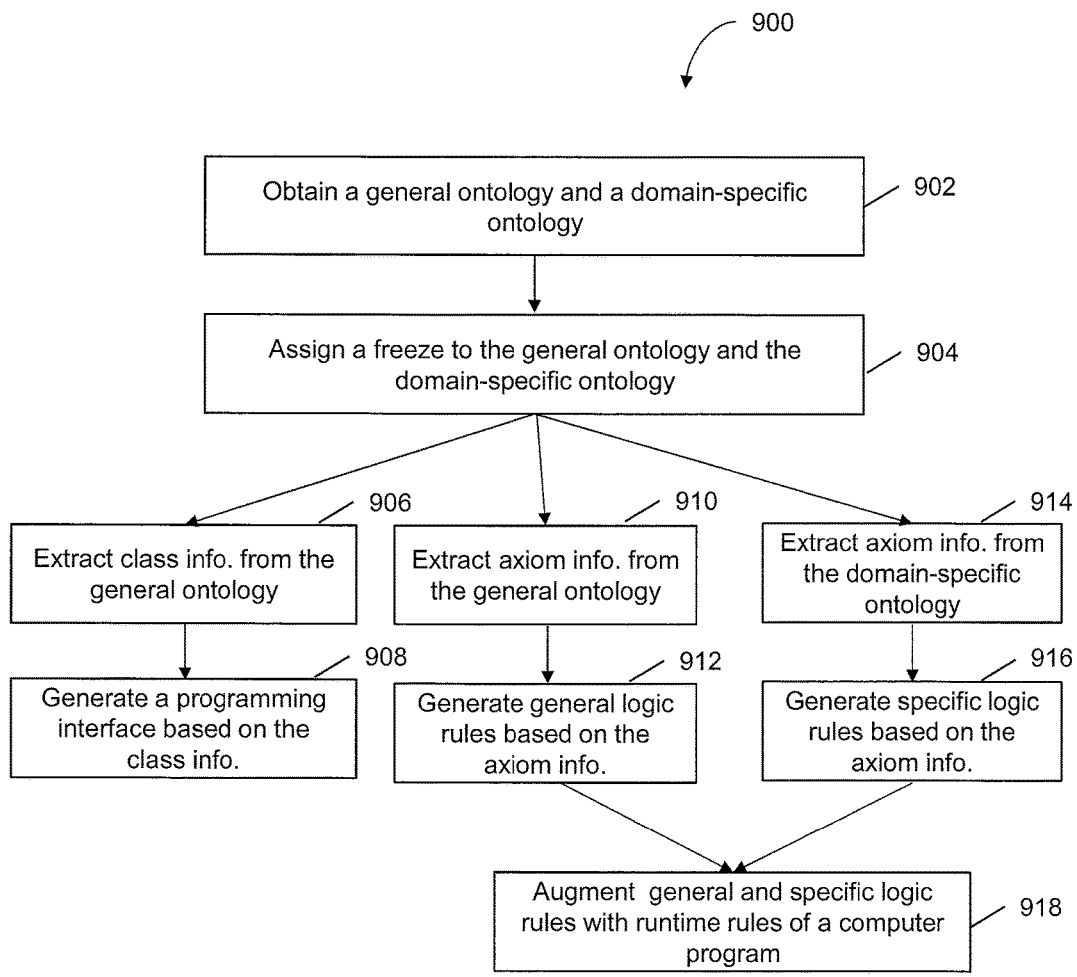
FIG. 9 is a flowchart of a method of generating a programming interface and logic rules based on a domain-specific ontology and a general ontology, in accordance with some embodiments.

In addition to a class ontology describing a class of application, a particular application often needs to access domain-specific information. The traditional approach to add domain-specific information to an application is to have programmers write application code embodying the domain-specific knowledge in some programming language, or to have the application code be generated automatically based on some information gathered from a business analyst or a domain expert. FIGS. 7-9 illustrate an example of providing supplemental functionalities for a computer program (e.g., an executable program or other computer program) via a domain-specific ontology and a general ontology instance. That is, a computer program may be specialized in a particular domain of interest using a domain-specific ontology without changing the computer code of the computer program.

As shown in FIG. 7, a general ontology 702 is obtained. The general ontology 702 may be a domain meta model ontology designed to describe the class structure of any domain-specific ontologies 704. The domain-specific ontologies 704 may be associated with domains of interest 706, such as the ones listed in Table 1. The general ontology 702 may not be modified and may have no dependency on any domain-specific ontologies 704. This may become a known and explicit structure used by an executable program 709 to interpret the structure of a particular domain-specific ontology 710. An example general ontology (domain meta model ontology) has been shown above with respect to FIG. 14, and an example domain-specific ontology 710 in the human resource domain has been shown above with respect to FIG. 15. The general ontology in FIG. 14 can be used to interpret any domain-specific ontologies 704, including the human resource domain ontology in FIG. 15.

As mentioned above, both class information and axiom information may be extracted from the general ontology 702 and used to generate the programming interface and logic rules, respectively. Similarly, axiom information may be extracted from the domain-specific ontology 710 and used to generate the specific logic rules. The specific logic rules may be applied to an instance 708 of the general ontology 702 by the executable program 709. Following the human resource domain ontology example described in FIG. 15, the axioms of the human resource domain ontology may be captured in logic rules that are generated automatically from the human resource domain ontology using a computer program. For example, the axiom information includes axioms for the class BoardDirector. The restriction that a BoardDirector must have a role of type BoardDirectorRole is expressed as:

```
# hr:hasRole some hr:BoardDirectorRole
[n=hr12, s=100]: (?s rdf:type hr:BoardDirector).(?s hr:hasRole ?o).(?o rdf:type
hr:BoardDirectorRole) -> (?s top:consistent_on hr:hasRole)
[n=hr13, s=10]: (?s rdf:type hr:BoardDirector).not(?s top:consistent_on
hr:hasRole) -> (?s rdf:type owl:Nothing)
```

The first rule indicates that a BoardDirector with a role of BoardDirectorRole is a consistent individual with regard to the property hasRole. The second rule indicates the complement of the first rule, meaning that a BoardDirector that does not have a consistent relationship on the property hasRole is an inconsistent individual (indicated as a member of Nothing).

Referring back to FIG. 7, the instance 708 of the general ontology 702 may be obtained. The general ontology instance 708 may be based on the domain-specific ontology 710 and correspond to an application 712 in the domain of interest associated with the domain-specific ontology 710. Supplemental information 714 may be generated for the executable program 709 based on the general ontology instance 708. The supplemental information 714 may be related to the functionalities 716 of the application 712. The supplemental information 714 may be provided as input to the executable program 709 at runtime so as to enable the application functionalities 716 to be available via the executable program 709. As mentioned above with respect to FIG. 3, the programming interface generated based on the general ontology 702 may be provided to the executable program 709 for accessing the supplemental information 714 in a working memory at runtime. The executable program 709 may also include the rule engine 310 to execute the generated logic rules associated with programming interface and the domain-specific ontology 710. At runtime, the executable program 709 may be provided with the supplemental information 714 (e.g., domain-specific metadata information). This supplemental information 714 may be accessed programmatically using the generated programming interface (e.g., class structure). Logic rules may be supplied for the executable program 709 without the need to modify the computer code of the executable program. As mentioned above, the runtime rules govern the execution of the executable program 709 and do not alter the ontological definition of the general and domain-specific ontologies 702 and 710. The runtime rules may be used in conjunction with the generated logic rules from the axioms of the domain-specific ontology 710 and applied on the inputted supplemental information 714.

Following the domain meta model ontology example in FIG. 14 and the human resource domain ontology example described in FIG. 15, the ontology instance 708 is an instance of the example domain meta model ontology, the domain-specific ontology 710 is the example human resource domain ontology, and the application 712 is a human resource application. The example human resource domain ontology may be described using the instance of the domain meta model ontology. The domain meta model ontology can be used to describe any domain-specific ontology, which is an important productivity gain since the class of applications only needs to know the structure of the domain meta model ontology, using the generated classes in any programming language, to discover any domain-specific ontology without the need to change the executable program

709. As an example, the following is an extract of the domain meta model ontology instance generated automatically using a computer program with the example human resource domain ontology as input:

```
(i_hr:BoardDirector, rdf:type, domain:ClassMetadata)
(i_hr:BoardDirector, domain:className, "hr:BoardDirector")
(i_hr:BoardDirector, domain:directSubClassOf, i_hr:Person)
(i_hr:BoardDirector, domain:allProperties,
i_hr:BoardDirector-hr:firstName)
(i_hr:BoardDirector, domain:allProperties,
i_hr:BoardDirector-hr:hasRole)
(i_hr:BoardDirector, domain:allProperties,
i_hr:BoardDirector-hr:lastName)
(i_hr:BoardDirector-hr:hasRole, rdf:type, domain:PropertyMetadata)
(i_hr:BoardDirector-hr:hasRole, domain:propertyName, "hr:hasRole")
(i_hr:BoardDirector-hr:hasRole, domain:range, "hr:Role")
(i_hr:BoardDirector-hr:hasRole, domain:hasSomeValueFromRestriction,
"hr:BoardDirectorRole")
(i_hr:BoardDirector-hr:hasRole, domain:isFunctionalProperty, "0")
(i_hr:BoardDirector-hr:hasRole, domain:isObjectProperty, "1")
```

In the extract above, the class hr:BoardDirector is described using an instance of domain:ClassMetadata named i_hr:BoardDirector. The property hr:hasRole is described using an instance of domain:PropertyMetadata and the restriction that a BoardDirector must have a role with value from the class hr:BoardDirectorRole has been captured.

The metadata describing the human resource domain ontology may be augmented with entailments from the domain meta model ontology (inferred metadata). This augments the metadata information with the inferred class structure. Using the human resource domain ontology as input, the augmented metadata information obtained after applying the logic rules generated based on the domain meta model ontology is:

```
i_hr:BoardDirector, rdf:type, owl:Thing)
(i_hr:BoardDirector, rdf:type, domain:DomainMetaModel)
(i_hr:BoardDirector, rdf:type, domain:ClassMetadata)
(i_hr:BoardDirector, domain:className, "hr:BoardDirector")
(i_hr:BoardDirector, domain:directSubClassOf, i_hr:Person)
(i_hr:BoardDirector, domain:subClassOf, i_owl:Thing)
(i_hr:BoardDirector, domain:subClassOf, i_hr:ResourceManagement)
(i_hr:BoardDirector, domain:subClassOf, i_hr:Person)
(i_hr:BoardDirector, domain:allProperties,
i_hr:BoardDirector-hr:firstName)
(i_hr:BoardDirector, domain:allProperties,
i_hr:BoardDirector-hr:hasRole)
(i_hr:BoardDirector, domain:allProperties,
i_hr:BoardDirector-hr:lastName)
(i_hr:BoardDirector-hr:hasRole, rdf:type, owl:Thing)
(i_hr:BoardDirector-hr:hasRole, rdf:type, domain:DomainMetaModel)
(i_hr:BoardDirector-hr:hasRole, rdf:type, domain:PropertyMetadata)
(i_hr:BoardDirector-hr:hasRole, domain:propertyName, "hr:hasRole")
(i_hr:BoardDirector-hr:hasRole, domain:range, "hr:Role")
(i_hr:BoardDirector-hr:hasRole, domain:hasSomeValueFromRestriction,
"hr:BoardDirectorRole")
(i_hr:BoardDirector-hr:hasRole, domain:isFunctionalProperty, "0")
(i_hr:BoardDirector-hr:hasRole, domain:isObjectProperty, "1")
```

The inferred entailments (additional supplemental information) are indicated in bold above.

In some embodiments, the expressibility of the executable program may be augmented by integrating the general ontology into a class ontology describing a class of applications. The expressibility of the resulting executable program can be increased by integrating the general ontology (e.g., a domain meta model ontology) with the class ontology. This integration may be done by importing the general ontology into the class ontology in order to specify domain-specific dependency.

As an example, it may be desired to inform the mapping algorithm of axioms present in the target elements, e.g., if the property is a functional property or the ability to ensure the validity of the type is used in the range of the target element. Specifically, consider the equivalent specification of the above-mentioned example of an employee on-boarding process using the instance of the domain metal model ontology as metadata describing the human resource domain ontology example:

```

# Metadata describing Acme Employee On-Boarding Process

(acme-bpmn-hr2:iAcmeOnboardingProcess, rdf:type, bpmn2:Process)
(acme-bpmn-hr2:iAcmeOnboardingProcess, rdf:type, owl:NamedIndividual)
(acme-bpmn-hr2:iAcmeOnboardingProcess, bpmn2:hasFlowElement, acme-bpmn-
hr2:iOnboardingStartEvent)
(acme-bpmn-hr2:iOnboardingStartEvent, rdf:type, bpmn2:StartEvent)
(acme-bpmn-hr2:iOnboardingStartEvent, rdf:type, owl:NamedIndividual)
(acme-bpmn-hr2:iOnboardingStartEvent, bpmn2:hasEventDefinitions, acme-bpmn-
hr2:iOnboardingStartEventDefinition)
(acme-bpmn-hr2:iOnboardingStartEventDefinition, rdf:type,
bpmn2:MessageEventDefinition)
(acme-bpmn-hr2:iOnboardingStartEventDefinition, rdf:type, owl:NamedIndividual)
(acme-bpmn-hr2:iOnboardingStartEventDefinition, bpmn2:hasMappingElements, acme-
bpmn-hr2:iOnboardingEmployeeMappingElement)
(acme-bpmn-hr2:iOnboardingEmployeeMappingElement, rdf:type, bpmn2:MappingElement)
(acme-bpmn-hr2:iOnboardingEmployeeMappingElement, rdf:type, owl:NamedIndividual)
(acme-bpmn-hr2:iOnboardingEmployeeMappingElement,
bpmn2:hasDomainEntityMappingDefinition, acme-bpmn-hr2:iEmployeeMappingDefinition)
(acme-bpmn-hr2:iEmployeeMappingDefinition, rdf:type,
domain:DomainEntityMappingDefinition)
(acme-bpmn-hr2:iEmployeeMappingDefinition, rdf:type, owl:NamedIndividual)
(acme-bpmn-hr2:iEmployeeMappingDefinition, domain:entityClassMetadata,
i_hr:Employee)
(acme-bpmn-hr2:iEmployeeMappingDefinition,
domain:hasDomainPropertyMappingDefinitions, acme-bpmn-
hr2:iFirstNameMappingDefinition)
(acme-bpmn-hr2:iEmployeeMappingDefinition,
domain:hasDomainPropertyMappingDefinitions, acme-bpmn-
```

```
hr2:iLastNameMappingDefinition)
(acme-bpmn-hr2:iFirstNameMappingDefinition, rdf:type,
domain:DomainPropertyMappingDefinition)
(acme-bpmn-hr2:iFirstNameMappingDefinition, rdf:type, owl:NamedIndividual)
(acme-bpmn-hr2:iFirstNameMappingDefinition, domain:sourceFieldName, "GivenName")
(acme-bpmn-hr2:iFirstNameMappingDefinition, domain:sourceFieldType, "xsd:string")
(acme-bpmn-hr2:iFirstNameMappingDefinition, domain:targetPropertyMetadata,
i_hr:Employee-firstName)
(acme-bpmn-hr2:iLastNameMappingDefinition, rdf:type,
domain:DomainPropertyMappingDefinition)
(acme-bpmn-hr2:iLastNameMappingDefinition, rdf:type, owl:NamedIndividual)
(acme-bpmn-hr2:iLastNameMappingDefinition, domain:sourceFieldName, "FamilyName")
(acme-bpmn-hr2:iLastNameMappingDefinition, domain:sourceFieldType, "xsd:string")
(acme-bpmn-hr2:iLastNameMappingDefinition, domain:targetPropertyMetadata,
i_hr:Employee-lastName)

# Metadata describing HR sample Domain Ontology

(i_hr:Employee, rdf:type, domain:ClassMetadata)
(i_hr:Employee, rdf:type, owl:NamedIndividual)
(i_hr:Employee, domain:className, "hr:Employee")
(i_hr:Employee, domain:directProperties, i_hr:Employee-firstName)
(i_hr:Employee, domain:directProperties, i_hr:Employee-lastName)
(i_hr:Employee-firstName, rdf:type, domain:PropertyMetadata)
(i_hr:Employee-firstName, rdf:type, owl:NamedIndividual)
(i_hr:Employee-firstName, domain:propertyName, "hr:firstName")
(i_hr:Employee-firstName, domain:range, "xsd:string")
(i_hr:Employee-firstName, domain:isFunctionalProperty, "1")
(i_hr:Employee-firstName, domain:isObjectProperty, "0")
(i_hr:Employee-lastName, rdf:type, domain:PropertyMetadata)
(i_hr:Employee-lastName, rdf:type, owl:NamedIndividual)
(i_hr:Employee-lastName, domain:propertyName, "hr:lastName")
(i_hr:Employee-lastName, domain:range, "xsd:string")
(i_hr:Employee-lastName, domain:isFunctionalProperty, "1")
(i_hr:Employee-lastName, domain:isObjectProperty, "0")
```

In the domain:DomainEntityMappingDefinition the Domain Entity is specified as an instance of domain:ClassMetadata (range of property domain:entityClassMetadata is of type domain:ClassMetadata; see highlights above in bold). Also, the Domain Property Mapping Definition (instances of domain:DomainPropertyMappingDefinition) has an instance of domain:PropertyMetadata for range of domain: targetPropertyMetadata (see highlights above in bold). This provides a rich metadata description of the target domain-specific entities with full access to axioms and restrictions providing the ability of the executable program to enforce or validate them at runtime.

FIG. 8 is a flowchart 800 of a method of providing supplemental functionalities for an executable program via a domain-specific ontology and an instance of a general ontology, in accordance with some embodiments.

In an operation 802, a computer program may be caused to be run. Operation 802 may be performed by one or more processors that are the same as or similar to the processors 106, in accordance with one or more embodiments.

In an operation 804, a general ontology and a domain-specific ontology may be obtained. The domain-specific ontology may be associated with a domain of interest, and the general ontology can be used to interpret the domain-specific ontology. Operation 804 may be performed by an ontology management subsystem that is the same as or similar to the ontology management subsystem 112, in accordance with one or more embodiments.

In an operation 806, an instance of the general ontology may be obtained. The general ontology instance may be based on the domain-specific ontology and correspond to an application associated with the domain of interest. Operation 806 may be performed by an ontology management subsystem that is the same as or similar to the ontology management subsystem 112, in accordance with one or more embodiments.

In an operation 808, supplemental information for the computer program may be generated based on the general ontology instance. The supplemental information may be related to functionalities of the application. Operation 808 may be performed by a supplemental information generation subsystem that is the same as or similar to the supplemental information generation subsystem 114, in accordance with one or more embodiments.

In an operation 810, the supplemental information may be provided as input to the computer program to enable the functionalities of the application to be available via the computer program. Operation 810 may be performed by one or more processors that are the same as or similar to the processors 106, in accordance with one or more embodiments.

It should be understood that, in some embodiments, operations 804-810 may be repeated to enable different functionalities of another application in a different domain of interest to be available via the computer program. For example, another domain-specific ontology in the different domain of interest and another general ontology instance corresponding to the other application may be obtained, and another supplemental information related to the different functionalities may be generated based on the other general ontology instance and domain-specific ontology and provided as input to the computer program.

FIG. 9 is a flowchart 900 of a method of generating a programming interface and logic rules based on a domain-specific ontology and a general ontology instance, in accordance with some embodiments.

In an operation 902, a general ontology and a domain-specific ontology may be obtained. Operation 902 may be performed by an ontology defining component that is the same as or similar to the ontology defining component 202, in accordance with one or more embodiments.

In an operation 904, a freeze may be assigned to the general ontology and domain-specific ontology that disables further modification of the ontologies. In some embodiments, the freeze may be assigned once an ontology has been completed and validated to ensure the consistency of the ontology. Operation 904 may be performed by an ontology validation component that is the same as or similar to the ontology validation component 204, in accordance with one or more embodiments.

In an operation 906, class information may be extracted from the general ontology. The class information may include, for example, class structures, data properties associated with each class, and the relationships between classes. Operation 906 may be performed by a programming interface generation component that is the same as or similar to the programming interface generation component 206, in accordance with one or more embodiments.

In an operation 908, a programming interface may be generated based on the class information of the general ontology. The programming interface may be in the form of computer code in a programming language and may be used by a computer program (e.g., the computer program of FIG. 8) for accessing metadata information stored in the working memory. Operation 908 may be performed by a programming interface generation component that is the same as or similar to the programming interface generation component 206, in accordance with one or more embodiments.

In an operation 910, axiom information may be extracted from the general ontology. Operation 910 may be performed by a logic rule generation component that is the same as or similar to the logic rule generation component 208, in accordance with one or more embodiments.

In an operation 912, general logic rules may be generated based on the axiom information of the general ontology. The general logic rules may be used to infer additional metadata, e.g., entailments on the objects of the domain-specific ontology. Operation 912 may be performed by a logic rule generation component that is the same as or similar to the logic rule generation component 208, in accordance with one or more embodiments.

In an operation 914, axiom information may be extracted from the domain-specific ontology. Operation 914 may be performed by a logic rule generation component that is the same as or similar to the logic rule generation component 208, in accordance with one or more embodiments.

In an operation 916, specific logic rules may be generated based on the axiom information of the domain-specific ontology. The specific logic rules may be applied to manipulate the supplemental information by the computer program. Operation 916 may be performed by a logic rule generation component that is the same as or similar to the logic rule generation component 208, in accordance with one or more embodiments.

In an operation 918, general and specific logic rules may be augmented with runtime rules of the computer program. The augmented rules may be used for executing the computer program at runtime. Operation 918 may be performed by a logic rule generation component that is the same as or similar to the logic rule generation component 208, in accordance with one or more embodiments.

Functionalities Provided Via Domain-Specific and Class Ontology Instances

One aspect of this invention by which one can generate a class of applications from a class ontology described in FIGS. 4-6 can be combined with the other aspect of this invention described in FIGS. 7-9 to generate a specialized application with domain-specific knowledge that belongs to a class of applications.

As an example, an application for on-boarding new employees by the human resource department of an organization is an application that belongs to the class of BPM applications. This application is specialized with human resource domain knowledge. The specialization of the application is two-fold: 1) the new employee on-boarding business process is an application that belongs to the class of BPM applications, and 2) the inclusion of human resource domain-specific knowledge specializes the on-boarding process by using data elements or attributes that are specific to an organization or industry. Combining a class of applications associated with a class ontology with a domain-specific ontology may result in a semantically informed computer program (e.g., an executable program) that is a programmatic representation of the class of applications applied to the specific domain by the underlying ontologies.

Figure 10:
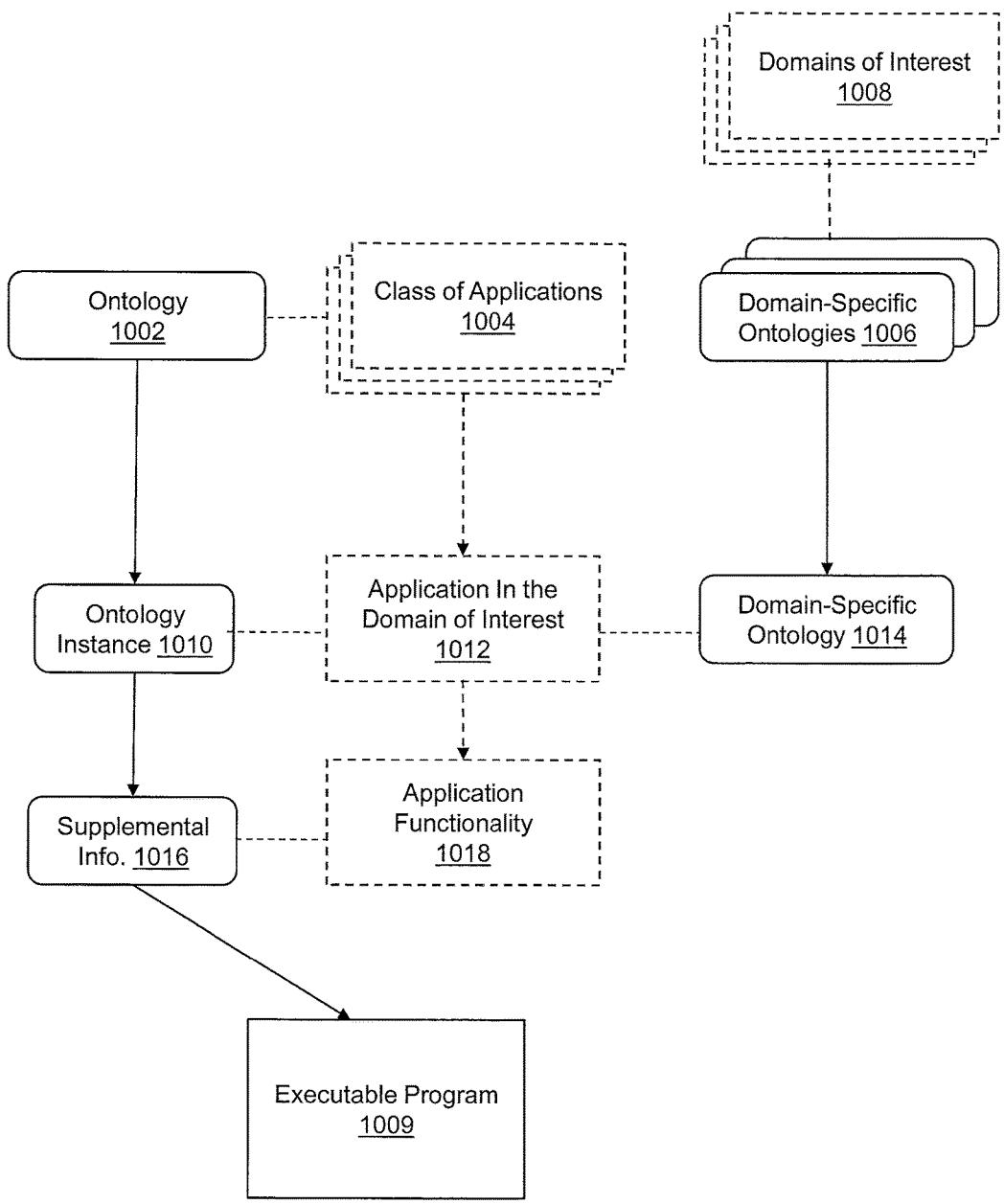
FIG. 10 shows a process of providing supplemental functionalities for a computer program via a domain-specific ontology and an instance of an ontology describing a class of applications, in accordance with some embodiments.
Figure 11:
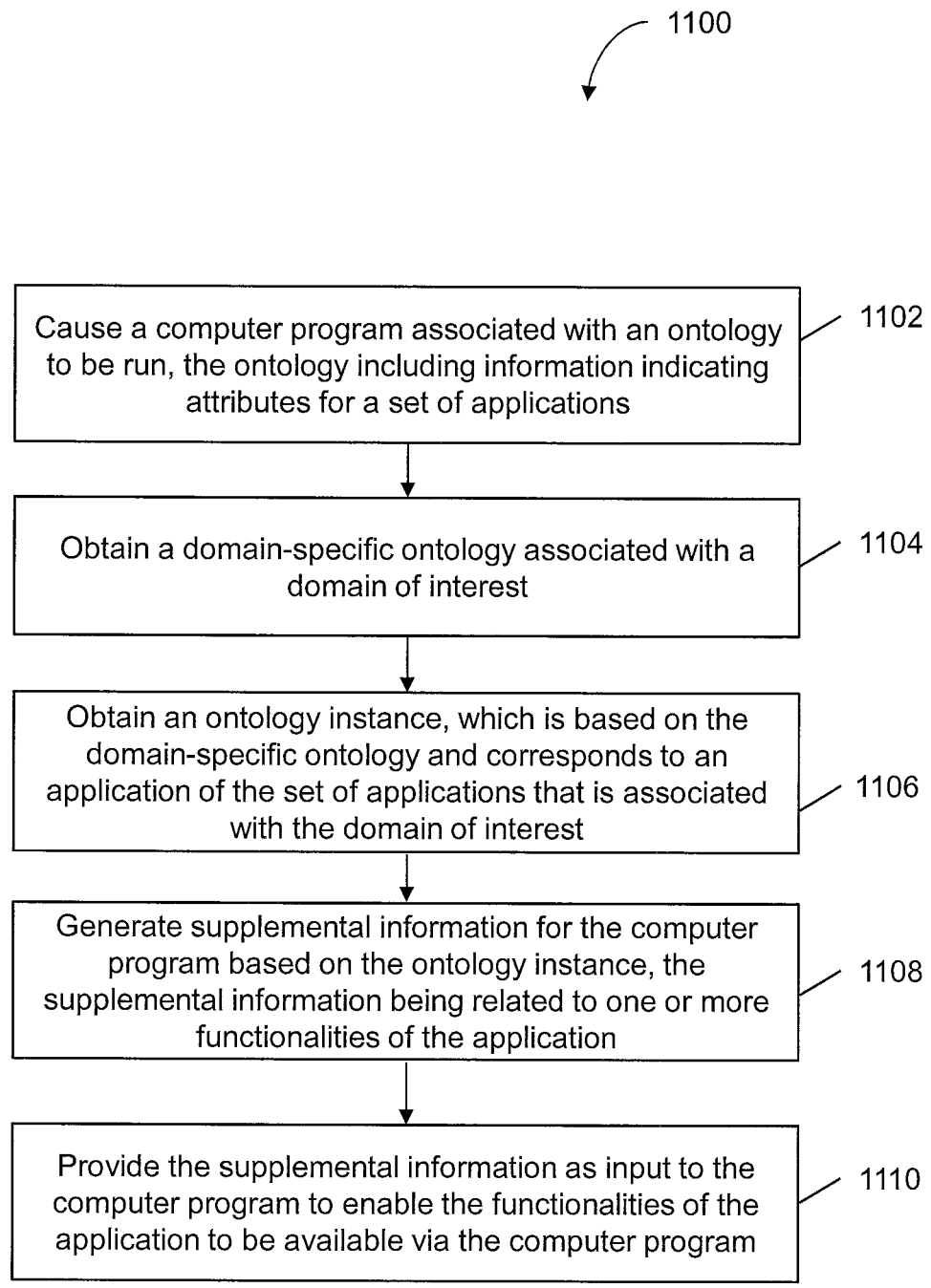
FIG. 11 is a flowchart of a method of providing supplemental functionalities for a computer program via a domain-specific ontology and an instance of an ontology describing a class of applications, in accordance with some embodiments.
Figure 12:
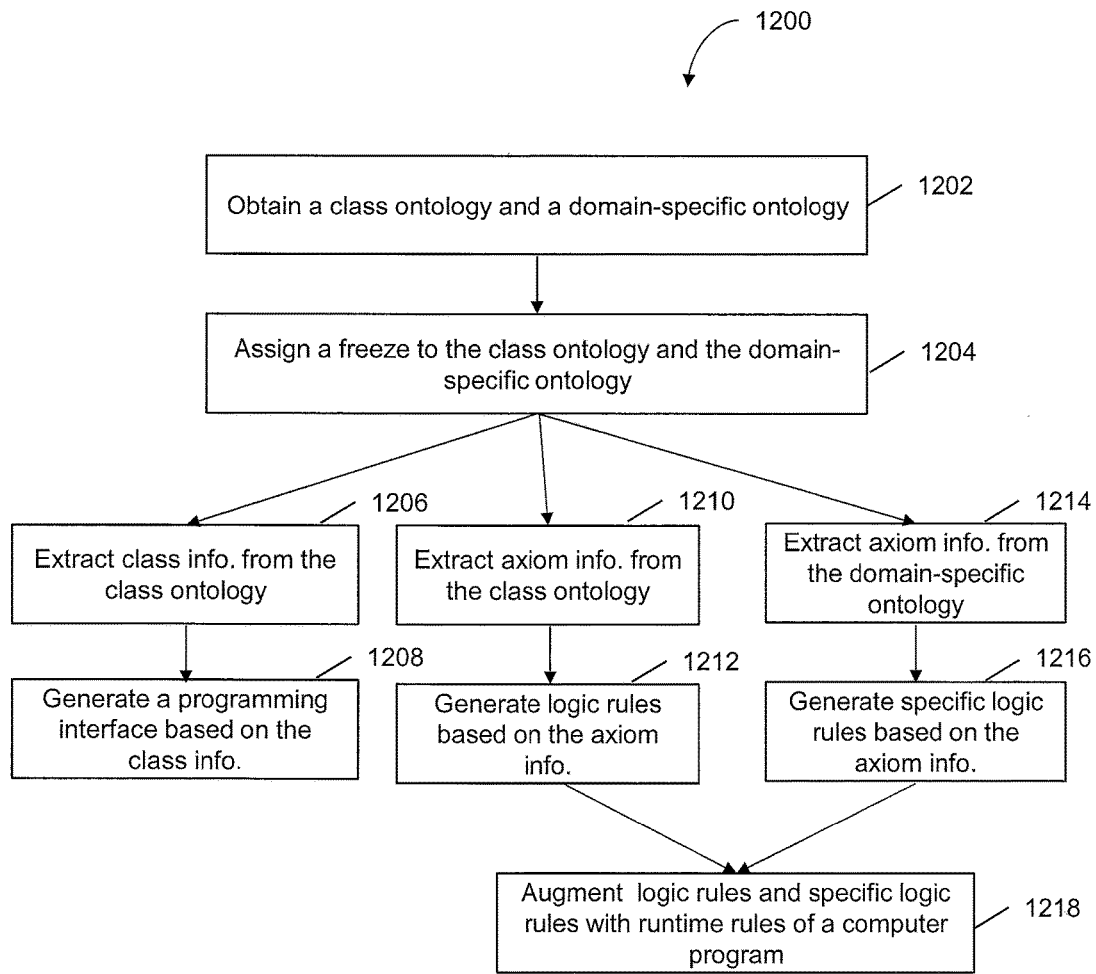
FIG. 12 is a flowchart of a method of generating a programming interface and logic rules based on a domain-specific ontology and an instance of an ontology describing a class of applications, in accordance with some embodiments.

FIGS. 10-12 illustrate an example of providing supplemental functionalities for a computer program (e.g., an executable program or other computer program) via a domain-specific ontology and a class ontology instance. As shown in FIG. 10, an ontology 1002 (a class ontology) is obtained. The class ontology 1002 may include information indicating attributes for a class of applications 1004. The class of applications 1004 may include the ones listed in Table 1. On the other hand, a domain-specific ontology 1014 may be selected from a set of domain-specific ontologies 1006, which are associated with a set of domains of interest 1008, such as such as the ones listed in Table 1. An example BPM class ontology has been shown above with respect to FIG. 13, and an example human resource domain-specific ontology has been shown above with respect to FIG. 15.

As mentioned above, both class information and axiom information may be extracted from the class ontology 1002 and used to generate the programming interface and logic rules, respectively. Similarly, axiom information may be extracted from the domain-specific ontology 1014 and used to generate the specific logic rules. The specific logic rules may be applied to an instance 1010 of the class ontology 1002 by an executable program 1009. The class ontology instance 1010 may be based on the domain-specific ontology 1014 and correspond to an application 1012 of the class of applications 1004 that is associated with the domain of interest.

Supplemental information 1016 may be generated for the executable program 1009 based on the class ontology instance 1010. The supplemental information 1016 may be related to the functionalities 1018 of the application 1012. The supplemental information 1016 may be provided as input to the executable program 1009 at runtime so as to enable the application functionalities 1018 to be available via the executable program 1009. As indicated above with respect to FIG. 3, the programming interface generated based on the class ontology 1002 may be provided to the executable program 1009 for accessing the supplemental information 1016 in a working memory at runtime. The executable program 1009 may also include the rule engine 310 to execute the generated logic rules associated with programming interface and the domain-specific ontology 1014. At runtime, the executable program 1009 may be provided with the supplemental information 1016 (e.g., domain-specific metadata information). This supplemental information 1016 may be accessed programmatically using the generated programming interface (e.g., class structure). Logic rules may be supplied for the executable program 1009 without the need to modify the computer code of the executable program 1009. As mentioned above, the runtime rules govern the execution of the executable program 1009 and do not alter the ontological definition of the class and domain-specific ontologies 1002, 1014. The runtime rules may be used in conjunction with the generated logic rules from the axioms of the domain-specific ontology 1014 and applied on the input supplemental information 1016.

FIG. 11 is a flowchart 1100 of a method of providing supplemental functionalities for a computer program (e.g., an executable program or other computer program) via a domain-specific ontology and an instance of an ontology describing a class of applications, in accordance with some embodiments.

In an operation 1102, a computer program associated with an ontology may be caused to be run. The ontology may include information indicating attributes for a set of applications (a class ontology for a class of applications). Operation 1102 may be performed by one or more processors that are the same as or similar to the processors 106, in accordance with one or more embodiments.

In an operation 1104, a domain-specific ontology may be obtained. The domain-specific ontology may be associated with a domain of interest. Operation 1104 may be performed by an ontology management subsystem that is the same as or similar to the ontology management subsystem 112, in accordance with one or more embodiments.

In an operation 1106, an instance of the class ontology may be obtained. The class ontology instance may be based on the domain-specific ontology and correspond to an application of the set of applications that is associated with the domain of interest. Operation 1106 may be performed by an ontology management subsystem that is the same as or similar to the ontology management subsystem 112, in accordance with one or more embodiments.

In an operation 1108, supplemental information for the computer program may be generated based on the class ontology instance. The supplemental information may be related to functionalities of the application. Operation 1108 may be performed by a supplemental information generation subsystem that is the same as or similar to the supplemental information generation subsystem 114, in accordance with one or more embodiments.

In an operation 1110, the supplemental information may be provided as input to the computer program to enable the functionalities of the application to be available via the computer program. Operation 1110 may be performed by one or more processors that are the same as or similar to the processors 106, in accordance with one or more embodiments.

It should be understood that, in some embodiments, operations 1106-1110 may be repeated to enable different functionalities of another application in the set of applications to be available via the computer program. For example, another class ontology instance corresponding to the other application may be obtained, and other supplemental information related to the different functionalities may be generated based on the other class ontology instance and the domain-specific ontology and provided as input to the computer program.

FIG. 12 is a flowchart 1200 of a method of generating a programming interface and logic rules based on a domain-specific ontology and a class ontology instance, in accordance with some embodiments.

In an operation 1202, a class ontology and a domain-specific ontology may be obtained. Operation 1202 may be performed by an ontology defining component that is the same as or similar to the ontology defining component 202, in accordance with one or more embodiments.

In an operation 1204, a freeze may be assigned to the class ontology and domain-specific ontology that disables further modification of the ontologies. In some embodiments, the freeze may be assigned once an ontology has been completed and validated to ensure the consistency of the ontology. Operation 1204 may be performed by an ontology validation component that is the same as or similar to the ontology validation component 204, in accordance with one or more embodiments.

In an operation 1206, class information may be extracted from the class ontology. The class information may include, for example, class structures, data properties associated with each class, and the relationships between classes. Operation 1206 may be performed by a programming interface generation component that is the same as or similar to the programming interface generation component 206, in accordance with one or more embodiments.

In an operation 1208, a programming interface may be generated based on the class information of the class ontology. The programming interface may be in the form of computer code in a programming language to be used by a computer program (e.g., the computer program of FIG. 11) for accessing metadata information stored in the working memory. Operation 1208 may be performed by a programming interface generation component that is the same as or similar to the programming interface generation component 206, in accordance with one or more embodiments.

In an operation 1210, axiom information may be extracted from the class ontology. Operation 1210 may be performed by a logic rule generation component that is the same as or similar to the logic rule generation component 208, in accordance with one or more embodiments.

In an operation 1212, logic rules may be generated based on the axiom information of the class ontology. The logic rules may be used to infer additional metadata, e.g., entailments on the objects of the domain-specific ontology. Operation 1212 may be performed by a logic rule generation component that is the same as or similar to the logic rule generation component 208, in accordance with one or more embodiments.

In an operation 1214, axiom information may be extracted from the domain-specific ontology. Operation 1214 may be performed by a logic rule generation component that is the same as or similar to the logic rule generation component 208, in accordance with one or more embodiments.

In an operation 1216, specific logic rules may be generated based on the axiom information of the domain-specific ontology. The specific logic rules may be applied to manipulate the supplemental information by the computer program. Operation 1216 may be performed by a logic rule generation component that is the same as or similar to the logic rule generation component 208, in accordance with one or more embodiments.

In an operation 1218, logic rules and specific logic rules may be augmented with runtime rules of the computer program. The augmented rules may be used for executing the computer program at runtime. Operation 1218 may be performed by a logic rule generation component that is the same as or similar to the logic rule generation component 208, in accordance with one or more embodiments.

The methods described herein may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

As used throughout this application, terms describing conditional relationships, e.g., "in response to X, Y," "upon X, Y," "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every.

Although the present invention has been described in detail for the purpose of illustration based on what are currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A method of providing supplemental functionalities to an executable program via an ontology instance, the method comprising:
    causing, by a computer system, an executable program associated with an ontology to be run, wherein the ontology comprises information indicating attributes for a set of applications;
    obtaining, by a computer system, an instance of the ontology, wherein the ontology instance corresponds to an application of the set of applications;
    generating, by a computer system, based on the ontology instance, supplemental information for the executable program, wherein the supplemental information is related to one or more functionalities of the application to be added to the executable program; and
    providing, by a computer system, the supplemental information as input to the executable program,
    wherein the supplemental information, at least in part, causes the one or more functionalities of the application to be made available via the executable program.

2. The method of claim 1, wherein the ontology instance (i) is based on a domain-specific ontology associated with a domain of interest and (ii) corresponds to an application associated with the domain of interest, and wherein the executable program is configured to use at least a portion of the ontology to interpret the domain-specific ontology.

3. The method of claim 1, further comprising:
    obtaining, by a computer system, another instance of the ontology, wherein the other ontology instance corresponds to another application of the set of applications;
    generating, by a computer system, based on the other ontology instance, another supplemental information for the executable program, wherein the other supplemental information is related to one or more functionalities of the other application; and
    providing, by a computer system, the other supplemental information as input to the executable program, wherein the other supplemental information, at least in part, causes the one or more functionalities of the other application be made available via the executable program.

4. The method of claim 1, wherein the one or more functionalities are made available via the executable program without recompiling the executable program.

5. The method of claim 1, wherein the executable program is configurable to perform a set of tasks common to a class of business application in each of several different domains of interest.

6. The method of claim 1, wherein the executable program obtains the supplemental information from working memory at runtime.

7. The method of claim 1, further comprising:
    assigning, by a computer system, a freeze to the ontology that disables further modification to the ontology.

8. The method of claim 1, further comprising:
    extracting, by a computer system, class information from the ontology; and
    generating, by a computer system, a programming interface based on the class information, wherein the programming interface allows the executable program to access the supplemental information, wherein providing comprises:
    providing, by a computer system, the supplemental information as input to the executable program via the programming interface.

9. The method of claim 1, further comprising:
    extracting, by a computer system, axiom information from the ontology, and
    generating, by a computer system, a set of logic rules based on the axiom information, wherein at least part of the supplemental information is generated based on the set of logic rules.

10. The method of claim 9, wherein the executable program includes a set of runtime rules that control the execution of the executable program, the method further comprising:
augmenting, by a computer system, the set of logic rules with the set of runtime rules to enable the one or more functionalities of the application to be available via the executable program.

11. The method of claim 1, wherein the supplemental information includes a data model for encoding metadata and knowledge on the Semantic Web using facts expressed as triples.

12. The method of claim 1, wherein the attributes for the set of applications include at least one class, at least one property, and at least one axiom.

13. A tangible, machine-readable, non-transitory media storing instructions that, when executed by one or more processors, effectuate operations comprising:
causing an executable program associated with an ontology to be run, wherein the ontology comprises information indicating attributes for a set of applications;
obtaining an instance of the ontology, wherein the ontology instance corresponds to an application of the set of applications;
generating, based on the ontology instance, supplemental information for the running executable program, wherein the supplemental information is related to one or more functionalities of the application; and
providing the supplemental information as input to the running executable program,
wherein the supplemental information, at least in part, causes the one or more functionalities of the application to be made available via the running executable program.

14. The media of claim 13, wherein the ontology instance (i) is based on a domain-specific ontology associated with a domain of interest and (ii) corresponds to an application associated with the domain of interest, and wherein the executable program is configured to use at least a portion of the ontology to interpret the domain-specific ontology.

15. The media of claim 13, wherein the one or more functionalities are made available via the running executable program without recompiling the executable program.

16. The media of claim 13, wherein the running executable program obtains the supplemental information from working memory at runtime.

17. The media of claim 13, wherein the instructions further effectuate operations comprising:
extracting class information from the ontology; and
generating a programming interface based on the class information, wherein the programming interface allows the running executable program to access the supplemental information, wherein providing comprises:
providing the supplemental information as input to the running executable program via the programming interface.

18. The media of claim 13, wherein the running executable program includes a set of runtime rules that control the execution of the running executable program, and wherein the instructions further effectuate operations comprising:
extracting axiom information from the ontology;
generating a set of logic rules based on the axiom information, wherein at least part of the supplemental information is generated based on the set of logic rules; and
augmenting the set of logic rules with the set of runtime rules to enable the one or more functionalities of the application to be available via the running executable program.

19. A system comprising:
one or more computer systems comprising one or more processors programmed with computer program instructions which, when executed, cause the one or more computer systems to:
cause an executable program associated with an ontology to be run, wherein the ontology comprises information indicating attributes for a set of applications;
obtain an instance of the ontology, wherein the ontology instance corresponds to an application of the set of applications;
generate, based on the ontology instance, supplemental information for the running executable program, wherein the supplemental information is related to one or more functionalities of the application; and
provide the supplemental information as input to the running executable program,
wherein the supplemental information, at least in part, causes the one or more functionalities of the application be made available via the running executable program.

20. The system of claim 19, wherein the running executable program obtains the supplemental information from working memory at runtime.

* * * * *